(12) United States Patent
Ribour et al.

(10) Patent No.: US 12,129,369 B2
(45) Date of Patent: Oct. 29, 2024

(54) PROCESS TO PRODUCE AN ADDITIVED COMPOSITION OF POLYETHYLENE COMPRISING POST-CONSUMER RESIN AND CAPS OR CLOSURES MADE FROM THIS COMPOSITION

(71) Applicant: TOTALENERGIES ONETECH BELGIUM, Seneffe (BE)

(72) Inventors: David Ribour, Seneffe (BE); Jenny Arbon, Seneffe (BE)

(73) Assignee: TOTALENERGIES ONETECH BELGIUM, Seneffe (BE)

( * ) Notice: Subject to any disclaimer, the term of this patent is extended or adjusted under 35 U.S.C. 154(b) by 0 days.

(21) Appl. No.: 18/554,488

(22) PCT Filed: Apr. 12, 2022

(86) PCT No.: PCT/EP2022/059783
§ 371 (c)(1),
(2) Date: Oct. 9, 2023

(87) PCT Pub. No.: WO2022/218996
PCT Pub. Date: Oct. 20, 2022

(65) Prior Publication Data
US 2024/0209195 A1 Jun. 27, 2024

(30) Foreign Application Priority Data
Apr. 13, 2021 (EP) .................... 21168207

(51) Int. Cl.
*C08L 23/08* (2006.01)
(52) U.S. Cl.
CPC ..... *C08L 23/0815* (2013.01); *C08L 2205/025* (2013.01); *C08L 2207/20* (2013.01); *C08L 2314/06* (2013.01)
(58) Field of Classification Search
CPC ............... B29C 45/0001; C08K 3/014; C08L 2205/025; C08L 2207/20; C08L 23/06; C08L 23/08; C08L 23/0815; C08L 2314/06

USPC ....................................................... 264/328.1
See application file for complete search history.

(56) References Cited

U.S. PATENT DOCUMENTS

| 9,359,493 B2 * | 6/2016 | Ribour ............... B29D 99/0096 |
| 2023/0173718 A1 * | 6/2023 | Hall ..................... B29C 41/003 |
| | | 264/255 |

FOREIGN PATENT DOCUMENTS

| EP | 0561187 | 9/1993 |
| WO | WO 2019/096745 | 5/2019 |
| WO | WO 2021/074171 | 4/2021 |

OTHER PUBLICATIONS

PCT International Search Report and Written Opinion issued in International Application No. PCT/EP2022/059783, dated Aug. 4, 2022.

* cited by examiner

Primary Examiner — Philip C Tucker
Assistant Examiner — Jimmy R Smith, Jr.
(74) Attorney, Agent, or Firm — NORTON ROSE FULBRIGHT US LLP

(57) ABSTRACT

The disclosure relates to a process to produce a composition of polyethylene comprising post-consumer resin for the production of caps and closures, comprising the steps of providing from 20 wt. % to 85 wt. % of a component A being one or more polyethylene post-consumer resins having a melt index ranging from 0.8 to 3.0 g/10 min, and a density ranging from 0.940 to 0.965 g/cm3: providing a component B being a polyethylene resin having a melt index (MI2) ranging from 0.5 to 3.5 g/10 min. and a density ranging from 0.940 to 0.965 g/cm3: providing one or more antioxidants: and blending the components and the one or more antioxidants to form a composition of polyethylene having a melt index ranging from 1.0 to 3.2 g/10 min; wherein the composition of polyethylene is having a z average molecular weight (Mz) of at most 390.000 g/mol as determined by gel permeation chromatography.

19 Claims, No Drawings

PROCESS TO PRODUCE AN ADDITIVED COMPOSITION OF POLYETHYLENE COMPRISING POST-CONSUMER RESIN AND CAPS OR CLOSURES MADE FROM THIS COMPOSITION

CROSS-REFERENCE TO RELATED APPLICATIONS

This application is a national phase application under 35 U.S.C. § 371 of International Application No. PCT/EP2022/059783, filed Apr. 12, 2022, which claims priority to European Patent Application No. 21168207.5, filed Apr. 13, 2021, each of which applications are incorporated by reference herein in their entirety.

TECHNICAL FIELD

The present invention relates to caps or closures made from a resin composition comprising more than 20 wt. % and preferably more than 40 wt. % of recycled material based on the total weight of the composition, to the process for producing such composition and such caps or closures as well as to their use.

TECHNICAL BACKGROUND

Today's ecological challenges are pushing more and more towards the fossil fuel economy and the recycling of plastic materials. The demand from the final customers to reduce their carbon footprint impact and energy consumption is important and implies high content of recycled material in such compositions. The compositions comprising recycled material may have at least 20 wt. % of recycled material based on the total weight of the composition for a commercial interest.

Caps and closures are widely used for various applications ranging from food and drink applications, or for non-food applications such as containers for agrochemicals or chemicals (e.g. motor oil), cosmetics or pharmaceuticals. Caps and closures are in general required to be strong enough to withstand the closure needs and soft enough to provide an excellent seal on the bottle or on the container.

Polyethylene has become a material of choice in the market of caps and closures because polyethylene offers a good balance of mechanical properties and can easily be processed either by injection moulding or by compression moulding. The composition to be used to produce caps and closures must show a good balance of mechanical properties comprising stiffness and environmental stress crack resistance (ESCR), but also have good slip properties (easier removal torque) and good processing properties.

Good balance of properties has been obtained on the compositions described in WO2018/037122 and in WO2019/096745, which are free of recycled material. However, it seems difficult to achieve this balance of properties using the resins described in these documents when the final composition contains 20 wt. % or more of recycled material, for example more than 40 wt. % of recycled material.

Therefore, a solution is still to be found to allow the incorporation of a content of recycled material of at least 20 wt. % in compositions directed to caps or closures applications.

Polyethylene compositions comprising recycled material are disclosed in several documents.

For example, WO2016/005265 relates to a process to produce a polyethylene composition comprising post-consumer resin comprising the steps of providing a high density polyethylene post-consumer resin having an ESCR of at most 10 hours, a density ranging from 0.950 to 0.967 g/cm$^3$, an HLMI of 40 to 70 g/10 min; providing a virgin Ziegler-Natta catalyzed polyethylene resin, wherein the virgin polyethylene resin has a multimodal distribution and comprises at least two polyethylene fractions A and B, fraction A having a higher molecular weight and lower density than fraction B, wherein fraction A has a HL275 of at least 0.1 g/10 min and of at most 4 g/10 min as and has a density of at least 0.920 g/cm$^3$ and of at most 0.942 g/cm$^3$; and the virgin polyethylene resin having an HLMI of 5 to 75 g/10 min, a density ranging from 0.945 to 0.960 g/cm$^3$; and blending the high density polyethylene post-consumer resin with the virgin polyethylene resin in to form a polyethylene composition, wherein said composition comprises from 15 to 70 wt. % of high density polyethylene post-consumer resin relative to the total weight of the composition.

WO2012/139967 relates to a process for recycling high density polyethylene waste from domestic polymer waste to obtain a polyethylene blend having excellent mechanical properties. In the process described, the post-consumer flakes are further sorted to eliminate at least a part of the material having a low ESCR.

WO91/19763 is directed to resin compositions useful for blow molding comprising recycled HDPE, optionally virgin HDPE and an additive selected from the group consisting of LLDPE, thermoplastic elastomers, mixtures of those elastomers and mixtures of LLDPE and at least one of those elastomers. The resin compositions preferably contain from about 0.1 to about 40 weight percent of recycled HDPE, from about 0.1 to about 50 weight percent of additive with the balance comprising virgin HDPE. The document also provides methods for improving the resistance to environmental stress cracking and/or to drop impact of blow molded products. These improvements are achieved by adding the additive in an amount sufficient to increase the ESCR and/or impact resistance of the product above that for a similar product comprised of the same resin but not including the additive.

EP3406666 relates to a process to produce a polyethylene composition comprising a post-consumer resin (PCR) comprising the steps of providing a component A being a polyethylene post-consumer resin having a HLMI A ranging from 15 to 70 g/10 min as determined according to ISO 1133/G; providing a component B being a chromium-catalysed polyethylene having a HLMI B of at most 10 g/10 min as determined according to ISO 1133/G, and a molecular weight distribution MWD of at least 10, wherein said component B is selected to have a HLMI B complying with the following relationship: HLMI B≤ (HLMI A/n) with n being at least 5, the component B being provided in pellets or in powder form; and melt-blending components A and B to form a polyethylene composition wherein the content of component B in the polymer composition is ranging from 5 to 50 wt % as based on the total weight of the polyethylene composition.

However, the above documents are related to blow molding applications or film applications, not to cap and closure which are made by injection molding or by compression molding.

WO2021/074171 discloses a process to produce a composition of polyethylene comprising post-consumer resin for the production of caps and closures comprising providing from 20 wt. % to 85 wt. % of one or more polyethylene post-consumer resins; providing a component B being a polyethylene resin and blending the components to form a composition having a melt index ranging from 0.8 to 3.0 g/10 min; wherein the composition has an environmental stress crack resistance of at least 360 hours according to ASTM D1693-15 at 100% Igepal and 50° C. and a weight-average molecular weight Mw of at least 90,000 g/mol.

Thus, an objective of the invention is to provide a process for the production of a recycled-based composition that contains at least 20 wt. % of recycled material based on the total weight of the composition; preferably at least 40 wt. % or at least 50 wt. %, but is suitable for cap or closure applications and shows, therefore, a desired balance of mechanical properties comprising stiffness and Closure (Cap) environmental stress crack resistance (Cap-ESCR), and good processing properties. An objective of the invention is to provide a process for the production of a recycled-based composition that contains at least 20 wt. % of recycled material based on the total weight of the composition that shows the same or an improved balance of properties than the corresponding virgin composition (i.e. without recycled material).

A further objective is to provide a process for the production of a composition comprising post-consumer resin suitable for cap and closure applications that, in addition, shows good slip properties and/or reduced weight. A further objective is to provide a process that is cost-effective. It is also an objective of the invention to provide such a composition comprising post-consumer resin, and the use of such composition in cap or closure applications.

SUMMARY OF THE INVENTION

Surprisingly, it has been found that the above objectives can be attained either individually or in any combination, by the use of a combination of a specific polyethylene (PE), acting as a booster, in a blend comprising at least 20 wt. % of a specific polyethylene post-consumer resin (PCR-PE) based on the total weight of the blend, and preferably at least 30 wt. %, or at least 40 wt. %, or at least 45 wt. %. In the disclosed composition, the PE and the PCR-PE are both selected to contribute to the final balance of properties.

According to a first aspect, the invention provides a process to produce a composition of polyethylene comprising post-consumer resins (PCR) for the production of caps and closures, the process is remarkable in that it comprises the steps of:
  providing from 20 wt. % to 85 wt. % based on the total weight of the composition of a component A being one or more polyethylene post-consumer resins (PCR-PE) having a melt index (MI2) ranging from 0.8 to 3.0 g/10 min as determined according to ISO 1133-1:2011 at a temperature of 190° C. and under a load of 2.16 kg, and a density ranging from 0.940 to 0.965 g/cm$^3$ as determined according to ISO 1183-1:2012 at 23° C.;
  providing a component B being a polyethylene resin having a melt index (MI2) ranging from 0.5 to 3.5 g/10 min as determined according to ISO 1133-1:2011 at a temperature of 190° C. and under a load of 2.16 kg, a density ranging from 0.940 to 0.965 g/cm$^3$ as determined according to ISO 1183-1:2012 at 23° C.;
  providing one or more antioxidants; and
  blending the components and the one or more antioxidants to form a composition of polyethylene having a melt index (MI2) ranging from 1.0 to 3.2 g/10 min as determined according to ISO 1133-1:2011 at a temperature of 190° C. and under a load of 2.16 kg; wherein the composition of polyethylene is having a z average molecular weight (Mz) of at most 390,000 g/mol as determined by gel permeation chromatography.

With preference, the step of blending the components and the one or more antioxidants is a step of melt-blending the components and the one or more antioxidants.

In an embodiment, at least a part of the one or more antioxidants are provided in addition to the components A and B. In an alternative or complementary way, at least a part of the one or more antioxidants are provided with the component A and/or the component B. For example, at least part of the one or more antioxidants are already present in the component A and/or in the component B and are provided together with the component A and/or the component B. With preference, one or more of the following embodiments can be used to better define the resulting composition of polyethylene:
  The composition of polyethylene has a melt index (MI2) ranging from 1.1 to 3.1 g/10 min as determined according to ISO 1133-1:2011 at a temperature of 190° C. and under a load of 2.16 kg; preferably ranging from 1.2 to 2.9 g/10 min, more preferably ranging from 1.3 to 2.8 g/10 min; even more preferably ranging from 1.5 to 2.6 g/10 min; most preferably from 1.6 to 2.5 g/10 min; and even most preferably ranging from 1.8 to 2.4 g/10 min.
  The composition of polyethylene has a density ranging from 0.940 to 0.960 g/cm$^3$ as determined according to ISO 1183-1:2012 at 23° C.; preferably ranging from 0.945 to 0.959 g/cm$^3$; more preferably, ranging from 0.949 to 0.958 g/cm$^3$; and most preferably, ranging from 0.951 to 0.957 g/cm$^3$.
  The composition of polyethylene comprises from 0.01 to 13.0 wt. % of polypropylene based on the total weight of the composition of polyethylene; preferably from 0.1 to 12.5 wt. %; more preferably from 0.5 to 10.0 wt. % even more preferably from 0.7 to 8 wt. %, and most preferably from 1.0 to 5.0 wt. %.
  The composition of polyethylene has a z average molecular weight (Mz) ranging from 200,000 g/mol to 390,000 g/mol as determined by gel permeation chromatography; preferably, from 250,000 to 378,000 g/mol; more preferably, from 260,000 to 375,000 g/mol; even more preferably, from 265,000 to 370,000 g/mol; and most preferably from 270,000 to 367,000 g/mol.
  The composition of polyethylene has a z average molecular weight (Mz) of at least 200,000 g/mol as determined by gel permeation chromatography.
  The composition of polyethylene has a z average molecular weight (Mz) of at most 375,000 g/mol as determined by gel permeation chromatography.
  The composition of polyethylene has weight-average molecular weight (Mw) of at least 50,000 g/mol and/or of at most 150,000 g/mol as determined by gel permeation chromatography; preferably ranging from 50,000 to 150,000 g/mol; more preferably from 60,000 to 120,000 g/mol, more preferably from 65,000 to 100,000 g/mol; and even more preferably, from 70,000 to 95,000 g/mol or from 65,000 to 87,000 g/mol.
  The composition of polyethylene has an Mz/Mw ranging from 3.0 to 6.0 as determined by gel permeation chromatography; preferably, from 3.2 to 5.5; more preferably from 3.5 to 5.3; and most preferably from 4.0 to 5.0.
  The composition of polyethylene has an Mw/Mn of at least 2.0 as determined by gel permeation chromatography, preferably of at least 3.0 or of at least 4.0; or preferably ranging from 2.0 to 8.0; more preferably ranging from 3.0 to 7.0; even more preferably, ranging from 4.0 to 6.5; most preferably, ranging from 4.3 to 6.2; and even most preferably, ranging from 4.5 to 6.0. or ranging from 4.6 to 5.9.

The composition of polyethylene has an environmental stress crack resistance (Bell ESCR) of at least 10 hours as determined according to ASTM D1693-15 at 100% Igepal® and 50° C.; with preference, of at least 15 hours or of at least 50 hours or of at least 80 hours.

The composition of polyethylene is having a tensile modulus of at least 900 MPa as determined according to ISO 527-1:2012; preferably, of at least 950 MPa; more preferably, of at least 1000 MPa.

In a preferred embodiment, the composition of polyethylene comprises from 100 to 5000 ppm of the one or more antioxidants based on the total weight of the composition; and/or the one or more antioxidants comprises at least one phenolic antioxidant and/or at least one organic phosphite or phosphonite antioxidant.

In a preferred embodiment, the composition comprises at least 100 ppm of one or more antioxidants being one or more phenolic antioxidants selected from octadecyl 3-(3',5'-di-t-butyl-4-hydroxyphenyl)propionate and/or pentaerythrityl-tetrakis(3-(3',5'-di-t-butyl-4-hydroxyphenyl)propionate.

In a preferred embodiment, the composition of polyethylene comprises at least 100 ppm of one or more antioxidants being at least one organic phosphite or phosphonite antioxidant selected from tris(2,4-ditert-butylphenyl) phosphite, bis(2,4-di-tert-butyl-6-methylphenyl)-ethyl-phosphite, tris-nonylphenyl phosphite, tetrakis-(2,4-di-t-butylphenyl)-4,4'-biphenylen-di-phosphonite, 2,4,6-tri-tert-butylphenyl 2-butyl-2-ethyl-1,3-propanediol phosphite and any blend thereof.

For example, the process further comprises a step of adding at least one slip agent selected from erucamide (i.e. cis-13-docosenoamide, CAS number 112-84-5), behenamide (i.e. docosanamide, CAS number 3061-75-4) or any mixture thereof to the composition of polyethylene; with preference, in a content of at least 300 ppm based on the total weight of the composition of polyethylene and/or in a content of at most 4000 ppm based on the total weight of the composition of polyethylene, preferably in a content of at most 2000 ppm based on the total weight of the composition of polyethylene.

For example, the process further comprises a step of adding at least one ultraviolet absorber selected from the hydroxyphenylbenzotriazole class to the composition of polyethylene; with preference, in a content of at least 500 ppm based on the total weight of the composition of polyethylene and/or in a content of at most 4000 ppm based on the total weight of the composition of polyethylene, preferably in a content of at most 2000 ppm based on the total weight of the composition of polyethylene.

Preferably, one or more of the following embodiments can be used to better define the process and the component A used in said process:

Component A is a post-consumer resin being a regrind from post-consumer sorted caps or closures.

Component A comprises from 0.01 to 15.0 wt. % of polypropylene, based on the total weight of the component A; more preferably from 0.5 to 13.0 wt. % even more preferably from 0.7 to 10.0 wt. %; most preferably from 0.9 to 8.0 wt. %; and even most preferably from 1.0 to 5.0 wt. %.

Component A has a melt index (MI2) ranging from 1.0 to 2.8 g/10 min as determined according to ISO 1133-1:2011 at a temperature of 190° C. and under a load of 2.16 kg; preferably ranging from 1.2 to 2.7 g/10 min, more preferably ranging from 1.4 to 2.6 g/10 min; even more preferably ranging from 1.7 to 2.6 g/10 min or from 1.5 to 2.8 g/10 min or from 1.6 to 2.4 g/10 min; and most preferably ranging from 1.8 to 2.2 g/10 min.

Component A has a density ranging from 0.942 to 0.962 g/cm$^3$ as determined according to ISO 1183-1:2012 at 23° C.; preferably ranging from 0.945 to 0.960 g/cm$^3$; more preferably, ranging from 0.947 to 0.958 g/cm$^3$; and most preferably, ranging from 0.949 to 0.955 g/cm$^3$ or from 0.940 to 0.949 g/cm$^3$ or from 0.951 to 0.961 g/cm$^3$.

In a preferred embodiment, the content of component A in the composition is ranging from 25 wt. % to 85 wt. % based on the total weight of the composition of polyethylene; preferably, ranging from 30 wt. % to 85 wt. %; more preferably, ranging from 35 wt. % to 80 wt. %; even more preferably, ranging from 40 wt. % to 75 wt. %; most preferably ranging from 40 wt. % to 70 wt. %; even most preferably ranging from 45 wt. % to 65 wt. %; or ranging from 40 wt. % to 60 wt. %.

Preferably, one or more of the following embodiments can be used to better define the process and the component B used in said process:

Component B is a metallocene-catalysed polyethylene resin and/or a Ziegler Natta-catalysed polyethylene resin; with preference, component B is a metallocene-catalysed polyethylene resin.

Component B is a polyethylene resin having a molecular weight distribution Mw/Mn which is at most 10.0 as determined by gel permeation chromatography, with Mw being the weight-average molecular weight and Mn being the number average molecular weight; or at most 8.0; preferably ranging from 2.0 to 8.0, more preferably ranging from 2.5 to 7.0, even more preferably from 3.0 to 6.0, and most preferably from 3.5 to 5.0.

Component B has a z average molecular weight (Mz) ranging from 100,000 g/mol to 300,000 g/mol as determined by gel permeation chromatography; preferably, from 120,000 to 250,000 g/mol; more preferably, from 140,000 to 220,000 g/mol; and most preferably, from 150,000 to 200,000 g/mol or from 155,000 to 198,000 g/mol.

Component B is a polyethylene resin having a melt index (MI2) ranging from 0.8 to 3.2 g/10 min as determined according to ISO 1133-1:2011 at a temperature of 190° C. and under a load of 2.16 kg; preferably ranging from 1.0 to 3.0 g/10 min and more preferably ranging from 1.2 to 2.8.8 g/10 min or from 1.5 to 2.6 g/10 min or from 1.6 to 2.4 g/10 min.

Component B is a polyethylene resin having a density ranging from 0.942 to 0.960 g/cm$^3$ as determined according to ISO 1183-1:2012 at 23° C.; preferably ranging from 0.945 to 0.957 g/cm$^3$ or from 0.947 to 0.955 g/cm$^3$; more preferably, ranging from 0.948 to 0.954 g/cm$^3$; and most preferably, ranging from 0.944 to 0.953 g/cm$^3$ or from 0.950 to 0.956 g/cm$^3$.

Component B has a bimodal molecular weight distribution.

Component B is a polyethylene resin being a copolymer of ethylene and one or more alpha-olefin co-monomers selected from the group comprising C3-C20 alpha-olefins; preferably, C3-C12 alpha-olefins; more preferably, C4-C8 alpha-olefins; most preferably, the co-monomer is selected from 1-butene or 1-hexene; even most preferably the co-monomer is 1-hexene.

Component B is a polyethylene resin being a copolymer of ethylene and one or more alpha-olefin co-monomers wherein the content of the one or more alpha-olefin co-monomers is ranging from 0.1 to 10.0 wt. % based on the total weight of component B as determined by 13C-NMR analysis; with preference from 0.2 to 6.0 wt. %.

In a preferred embodiment the component B is a polyethylene resin comprising at least two polyethylene fractions B1 and B2, wherein fraction B1 has an MI2 of at least 200 g/10 min or of at least 250 g/10 min as determined according to ISO 1133-1:2011 at a temperature of 190° C. and under a load of 2.16 kg and/or a density of at least 0.960 g/cm$^3$ or of at least 0.970 g/cm$^3$ as determined according to ISO 1183-1:2012 at 23° C.

With preference, fraction B1 has an MI2 ranging from 200 to 500 g/10 min as determined according to ISO 1133-1: 2011 at a temperature of 190° C. and under a load of 2.16 kg; preferably ranging from 220 to 450 g/10 min; more preferably ranging from 240 to 420 g/10 min; even more preferably ranging from 250 to 400 g/10 min; and most preferably ranging from 270 to 350 g/10 min.

With preference, fraction B1 has a density ranging from 0.960 to 0.980 g/cm$^3$ as determined according to ISO 1183-1:2012 at 23° C.; preferably ranging from 0.965 to 0.978 g/cm$^3$; more preferably ranging from 0.970 to 0.976 g/cm$^3$, or ranging from 0.968 to 0.975 g/cm$^3$.

With preference, fraction B1 is a polyethylene homopolymer.

In a preferred embodiment; the step of providing the component B comprises the sub-steps of preparing the component B, wherein component B comprises at least two polyethylene fractions B1 and B2; with the fraction B1 having an MI2 of at least 200 g/10 min as determined according to ISO 1133-1:2011 at a temperature of 190° C. and under a load of 2.16 kg and/or a density of at least 0.960 g/cm$^3$ as determined according to ISO 1183-1:2012 at 23° C., the sub-steps comprising:

feeding ethylene monomer, a diluent, at least one catalyst, optionally hydrogen, and optionally one or more alpha-olefin comonomers into at least one first reactor, polymerizing the ethylene monomer and optionally one or more alpha-olefin co-monomers, in the presence of the catalyst and optional hydrogen, in said first reactor to produce a polyethylene fraction B1; and feeding the polyethylene fraction B1 to a second reactor serially connected to the first reactor, and in the second reactor, polymerizing ethylene and optionally one or more alpha-olefin co-monomers, in the presence of the polyethylene fraction B1 and optionally hydrogen to produce the polyethylene resin of component B.

With preference, the one or more alpha-olefin co-monomers are selected from the group comprising C3-C20 alpha-olefins; preferably, C3-C12 alpha-olefins; more preferably, C4-C8 alpha-olefins; most preferably, the co-monomer is selected from 1-butene or 1-hexene; even most preferably the co-monomer is 1-hexene.

In a preferred embodiment, the content of component B in the composition is at least 15 wt. % based on the total weight of the composition of polyethylene; preferably, at least 20 wt. %; more preferably, at least 25 wt. %; even more preferably, at least 30 wt. %; most preferably at least 35 wt. %; even most preferably at least 40 wt. %; or at least 45 wt. %; or at least 50 wt. %.

In a preferred embodiment, the content of component B in the composition is ranging from 15 wt. % to 80 wt. % based on the total weight of the composition of polyethylene; preferably, ranging from 15 wt. % to 75 wt. %; more preferably, ranging from 20 wt. % to 70 wt. %; even more preferably, ranging from 20 wt. % to 65 wt. %; most preferably ranging from 30 wt. % to 60 wt. %; even most preferably ranging from 35 wt. % to 55 wt. %; or ranging from 40 wt. % to 60 wt. %; or ranging from 45 wt. % to 70 wt. %.

According to a second aspect, the invention provides a composition of polyethylene comprising one or more post-consumer resins (PCR) produced by the process according to the first aspect.

According to a third aspect, the invention provides a composition of polyethylene comprising from 20 wt. % to 85 wt. % of one or more post-consumer resins (PCR) based on the total weight of the composition of polyethylene and one or more antioxidants; the composition being remarkable in that it shows:
a MI2 ranging from 1.0 to 3.2 g/10 min as determined according to ISO 1133-1:2011 at a temperature of 190° C. and under a load of 2.16 kg;
a density ranging from 0.940 to 0.960 g/cm$^3$ as determined according to ISO 1183-1:2012 at 23° C.;
a weight-average molecular weight (Mw) of at least 50,000 g/mol as determined by gel permeation chromatography; and
a z average molecular weight (Mz) of at most 390,000 g/mol as determined by gel permeation chromatography.

For example, the composition of the third aspect is according to the second aspect; i.e. the composition of the third aspect is produced by the process according to the first aspect.

For example, the composition shows an Mz/Mw ranging from 3.0 to 6.0 as determined by gel permeation chromatography.

For example, the composition shows a z average molecular weight (Mz) of at most 375,000 g/mol as determined by gel permeation chromatography.

According to a fourth aspect, the invention provides a process for the production of caps or closures, said process comprising the steps of:
producing a composition of polyethylene comprising post-consumer resin (PCR) according to the process of the first aspect or providing a composition of polyethylene according to the second or to the third aspect; and
injection moulding or compression moulding of the composition of polyethylene into a cap or closure.

According to a fifth aspect, the invention provides the use of a composition of polyethylene according to the second or to the third aspect for the manufacture of a cap or closure; with preference, the cap or the closure is made by injection moulding or compression moulding.

According to a sixth aspect, the invention provides a cap or closure made of a composition of polyethylene according to the second or to the third aspect; with preference, the cap or closure is a screw cap.

According to a seventh aspect, the invention provides a cap or closure produced from the process according to the fourth aspect.

DETAILED DESCRIPTION OF THE INVENTION

When describing the invention, the terms used are to be construed in accordance with the following definitions, unless a context dictates otherwise.

As used herein, the singular forms "a", "an", and "the" include both singular and plural referents unless the context clearly dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all integer numbers and, where appropriate, fractions subsumed within that range (e.g. 1 to 5 can include 1, 2, 3, 4, 5 when referring to, for example, a number of elements, and can also include 1.5, 2, 2.75 and 3.80, when referring to, for example, measurements). The recitation of end points also includes the endpoint values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this invention, in one or more embodiments. Furthermore, while some embodiments described herein include some but not other features included in other embodiments, combinations of features of different embodiments are meant to be within the scope of the invention and form different embodiments, as would be understood by those in the art.

As used herein, the terms "melt blending" involve the use of shear force, extensional force, compressive force, ultrasonic energy, electromagnetic energy, thermal energy or combinations comprising at least one of the foregoing forces or forms of energy and is conducted in a processing equipment wherein the aforementioned forces are exerted by a single screw, multiple screws, intermeshing co-rotating or counter-rotating screws, non-intermeshing co-rotating or counter-rotating screws, reciprocating screws, screws with pins, barrels with pins, rolls, rams, helical rotors, or combinations comprising at least one of the foregoing. Melt blending may be conducted in machines such as, single or multiple screw extruders, Buss kneader, Eirich mixers, Henschel, helicones, Ross mixer, Banbury, roll mills, moulding machines such as injection moulding machines, vacuum forming machines, blow moulding machines, or the like, or combinations comprising at least one of the foregoing machines. It is generally desirable during melt or solution blending of the composition to impart a specific energy of about 0.01 to about 10 kilowatt-hours/kilogram (kW h/kg) of the composition. In a preferred embodiment, melt blending is performed in a twin-screw extruder, such as a Brabender co-rotating twin screw extruder.

The terms "polyethylene" (PE) and "ethylene polymer" may be used synonymously. The term "polyethylene" encompasses homopolymer of ethylene as well as copolymer of ethylene which can be derived from ethylene and one or more comonomers selected from the group consisting of $C_3$-$C_{20}$ alpha-olefins, such as propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene.

The terms "polyethylene resin", as used herein, refer to polyethylene fluff or powder that is extruded, and/or melted and/or pelletized and can be produced through compounding and homogenizing of the polyethylene resin as taught herein, for instance, with mixing and/or extruder equipment. As used herein, the term "polyethylene" may be used as a shorthand for "polyethylene resin". The terms "fluff" or "powder" as used herein refer to polyethylene material with the hard catalyst particle at the core of each grain and is defined as the polymer material after it exits the polymerization reactor (or the final polymerization reactor in the case of multiple reactors connected in series).

"The composition" may be used as a shorthand for "the composition of polyethylene".

Under normal production conditions in a production plant, it is expected that the melt index (MI2, HLMI, MI5) will be different for the fluff than for the polyethylene resin. Under normal production conditions in a production plant, it is expected that the density will be slightly different for the fluff, than for the polyethylene resin. Unless otherwise indicated, density and melt index for the polyethylene resin refer to the density and melt index as measured on the polyethylene resin as defined above.

The terms "virgin polyethylene" are used to denote a polyethylene directly obtained from an ethylene polymerization plant. The terms "directly obtained" is meant to include that the polyethylene may optionally be passed through a pelletization step or an additivation step or both.

The terms "Post Consumer Resin", which may be abbreviated as "PCR", is used to denote the component of domestic waste, household waste, etc.

The invention provides a process to produce a composition of polyethylene comprising post-consumer resins (PCR) for the production of caps and closures, the process comprising the steps of:

providing from 20 wt. % to 85 wt. % based on the total weight of the composition of polyethylene of a component A being one or more polyethylene post-consumer resins (PCR-PE) having a melt index (MI2) ranging from 0.8 to 3.0 g/10 min as determined according to ISO 1133-1:2011 at a temperature of 190° C. and under a load of 2.16 kg, and a density ranging from 0.940 to 0.965 g/cm$^3$ as determined according to ISO 1183-1:2012 at 23° C.;

providing a component B being a polyethylene resin having a melt index (MI2) ranging from 0.5 to 3.5 g/10 min as determined according to ISO 1133-1:2011 at a temperature of 190° C. and under a load of 2.16 kg, a density ranging from 0.940 to 0.965 g/cm$^3$ as determined according to ISO 1183-1:2012 at 23° C.;

providing one or more antioxidants; and blending the components and the one or more antioxidants to form a composition of polyethylene having a melt index (MI2) ranging from 1.0 to 3.2 g/10 min as determined according to ISO 1133-1:2011 at a temperature of 190° C. and under a load of 2.16 kg; wherein the composition of polyethylene is having a z average molecular weight (Mz) of at most 390,000 g/mol as determined by gel permeation chromatography.

Surprisingly, it has been found that the resulting composition of polyethylene may comprise a content of recycled material of at least 20 wt. %, but can be used in the manufacture of caps or closures at it shows a desired balance of mechanical properties comprising stiffness and closure environmental stress crack resistance (Cap-ESCR), and good processing properties. Indeed, as it is shown by the examples, it shows a tensile modulus of at least 900 MPa as determined according to ISO 527-1:2012, preferably at least 1000 MPa, together with good ESCR properties such as environmental stress crack resistance (Bell-ESCR) of at least 10 hours, preferably at least 14 hours, as determined according to ASTM D1693-15 at 100% Igepal® and 50° C. The Cap-ESCR is at least 10 hours; preferably at least 15 hours. In some embodiments, the Cap-ESCR is of at least 20 hours or of at least 30 hours.

In addition, the composition of polyethylene is showing good processability performances as it can be injected at a pressure of less than 150 MPa, preferably of less than 145 MPa during the manufacture of caps or closures.

In an embodiment the composition of polyethylene has an environmental stress crack resistance (ESCR) of at least 10 hours, as determined according to ASTM D1693-15 at 100% Igepal® and 50° C.; preferably of at least 12 hours or of at least 14 hours, more preferably of at least 50 hours, even more preferably of at least 80 hours, and most preferably of at least 90 hours.

In an embodiment, the composition of polyethylene has a tensile modulus of at least 900 MPa as determined according to ISO 527-1: 2012; preferably, of at least 950 MPa; more preferably, of at least 1000 MPa.

The blending of the components and the one or more antioxidants can be carried out according to any physical blending method and combinations thereof known in the art. This can be, for instance, dry blending, wet blending or melt blending. The blending conditions depend upon the blending technique and polyethylene involved.

If dry blending is employed, the dry blending conditions may include temperatures from room temperature up to just under the melting temperature of the polymer. The components can be dry blended prior to a melt blending stage, which can take place for example in an extruder. Melt processing is fast and simple and makes use of standard equipment of the thermoplastics industry. The components can be melt blended in a batch process such as in a Banbury, Haake or Brabender Internal Mixer or in a continuous process, such as in an extruder e.g. a single or twin-screw extruder, such as a ZKS twin screw extruder. During melt blending, the temperature at which the polymers are combined in the blender will generally be in the range between the highest melting point of the polymers employed and up to about 80° C. above such melting point, preferably between such melting point and up to 30° C. above it. The time required for the melt blending can vary broadly and depends on the method of blending employed. The time required is the time sufficient to thoroughly mix the components.

The one or more antioxidants can be provided in addition to the components A and B, and/or can be provided with the component A and/or with the component B. For example, at least part of the one or more antioxidants are already present in the component A and/or in the component B and provided together with the component A and/or the component B. In a preferred embodiment, at least a part of the one or more antioxidants are provided in addition to the components A and B.

In an embodiment, the step of providing a component B and the step providing one or more antioxidants form are distinct steps and/or in that that the step of providing from 20 wt. % to 85 wt. % based on the total weight of the composition of a component A and the step of providing one or more antioxidants are distinct steps. Alternatively, the step of providing a component B and the step providing one or more antioxidants form a single step and/or in that that the step of providing from 20 wt. % to 85 wt. % based on the total weight of the composition of a component A and the step of providing one or more antioxidants form a single step.

Selection of Component a being One or More Polyethylene Post-Consumer Resins (PCR-PE)

The component A is a post-consumer resin (PCR) that is preferably originated from a specific collection of domestic or household waste. Preferably, the polyethylene post-consumer resin (PCR-PE) is devoid of industrial waste. In a preferred embodiment, the component A is or comprises a regrind from post-consumer sorted caps. However, any polyethylene post-consumer resin fulfilling the requirements of the invention may be used.

An example of suitable PCR-PE that is commercially available is HDPE Regrind from post-consumer caps commercialized by Morssinkhof-Rymoplast in a formulation that is said to contain less than 3 wt. % of residual polypropylene or less than 5 wt. % of residual polypropylene.

For the process of the invention, the polyethylene post-consumer resin (PCR-PE) (i.e. the component A) is selected to have a melt index (MI2) ranging from 0.8 to 3.0 g/10 min as determined according to ISO 1133-1:2011 at a temperature of 190° C. and under a load of 2.16 kg. In a preferred embodiment, the component A is having a melt index (MI2) ranging from 0.9 to 2.9 g/10 min or from 1.0 to 2.8 g/10 min as determined according to ISO 1133-1:2011 at a temperature of 190° C. and under a load of 2.16 kg; preferably ranging from 1.2 to 2.7 g/10 min, more preferably ranging from 1.4 to 2.6 g/10 min or from 1.5 to 2.5 g/10 min; even more preferably ranging from 1.5 to 2.8 g/10 min or from 1.6 to 2.4 g/10 min; and most preferably ranging from 1.8 to 2.2 g/10 min.

With preference, component A has an MI2 of at least 0.8 g/10 min as determined according to ISO 1133-1:2011 at a temperature of 190° C. and under a load of 2.16 kg; preferably of at least 0.9 g/10 min or of at least 1.0 g/10 min; more preferably, of at least 1.2 g/10 min; even more preferably, of at least 1.4 g/10 min; most preferably, of at least 1.5 g/10 min; and even most preferably, of at least 1.6 g/10 min or of at least 1. 7 g/10 min, or of at least 1.8 g/10 min, or of at least 1.9 g/10 min, or of at least 2.0 g/10 min.

Preferably, component A has an MI2 of at most 3.0 g/10 min as determined according to conditions D at a temperature of 190° C. and under a load of 2.16 kg: preferably, of at most 2.9 g/10 min or of at most 2.8 g/10 min, more preferably of at most 2.7 g/10 min; even more preferably of at most 2.6 g/10 min, most preferably of at most 2.5 g/10 min, and even most preferably of at most 2.4 g/10 min or of at most 2.3 g/10 min or of at most 2.2 g/10 min.

According to the invention, the polyethylene post-consumer resin (PCR-PE) (i.e. the component A) is selected to have a density ranging from 0.940 to 0.965 g/cm$^3$ as determined according to ISO 1183-1:2012 at 23° C. In a preferred embodiment, component A has a density ranging from 0.941 to 0.962 g/cm$^3$ or ranging from 0.942 to 0.962 g/cm$^3$ as determined according to ISO 1183-1:2012 at 23° C.; preferably ranging from 0.945 to 0.960 g/cm³; more preferably, ranging from 0.947 to 0.958 g/cm³; and most preferably, ranging from 0.949 to 0.955 g/cm³ or from 0.940 to 0.949 g/cm³ or from 0.951 to 0.961 g/cm³.

With preference, component A has a density of at least 0.940 g/cm³ as determined according to ISO 1183-1:2012 at 23° C.; preferably, of at least 0.941 g/cm³, or of at least 0.942 g/cm³; more preferably, of at least 0.945 g/cm³; even more preferably, of at least 0.947 g/cm³; most preferably, of at least 0.948 g/cm³; and even most preferably, of at least 0.949 g/cm³ or at least 0.950 g/cm³ or of at least 0.951 g/cm³.

Preferably, component A has density of at most 0.965 g/cm³ as determined according to ISO 1183-1:2012 at 23° C.; preferably, of at most 0.962 g/cm³, or of at most 0.960 g/cm³, or of at most 0.959 g/cm³, more preferably of at most 0.958 g/cm³; even more preferably of at most 0.957 g/cm³, most preferably of at most 0.956 g/cm³, and even most preferably of at most 0.955 g/cm³ or of at most 0.954 g/cm³ or of at most 0.953 g/cm³.

In a preferred embodiment, the content of component A in the composition is ranging from 25 wt. % to 85 wt. % based on the total weight of the composition of polyethylene; preferably, ranging from 30 wt. % to 85 wt. %; more preferably, ranging from 35 wt. % to 80 wt. %; even more preferably, ranging from 40 wt. % to 75 wt. %; most preferably ranging from 40 wt. % to 70 wt. %; even most preferably ranging from 45 wt. % to 65 wt. %; or ranging from 40 wt. % to 60 wt. %. With preference, the content of component A in the composition is at least 25 wt. % or at least 30 wt. % based on the total weight of the composition of polyethylene; preferably at least 35 wt. %; more preferably at least 40 wt. %; even more preferably at least 50 wt. %; and most preferably at least 55 wt. %, or at least 60 wt. %, or at least 65 wt. %, or at least 70 wt. %.

With preference, the content of component A in the composition is at most 83 wt. % based on the total weight of the composition of polyethylene; preferably at most 80 wt. %; more preferably at most 75 wt. %; even more preferably at most 70 wt. %; and most preferably at most 65 wt. % or at most 60 wt. %.

The selected polyethylene post-consumer resin (PCR-PE) may comprise up to 15 wt. % of polypropylene relative to the total weight of the polyethylene post-consumer resin (PCR-PE).

In an embodiment, the component A is a blend of recycled polypropylene and recycled polyethylene, wherein the content of polypropylene is ranging from 0.01 to 15.0 wt. % based on the total weight of the component A; more preferably from 0.5 to 13.0 wt. % even more preferably from 0.7 to 10.0 wt. %; most preferably from 0.9 to 8.0 wt. %; and even most preferably from 1.0 to 5.0 wt. %.

The presence of polypropylene in component A is difficult to avoid and is due to the recycling process. Following its collection, the PCR needs to be processed. The processing comprises the steps of:
  recovering the polyethylene post-consumer resin (PCR-PE) from the domestic or household polymer waste by separating it,
  grinding, and
  cleaning.

The above grinding and cleaning steps may be performed in any order. The separation of domestic waste into several fractions such as polyethylene post-consumer resin (PCR-PE) can be performed by any method generally used in the industry such as near-infrared analysis (NIR), wherein the respective polymers are identified by their NIR-fingerprint. Further separation can be made according to colour with known separation systems.

Cleaning is preferably done in a liquid bath. The preferred liquid is water. Depending upon the density of the liquid, the cleaning step may also be used to eliminate undesired components of the domestic polymer waste. For example, polyethylene and polypropylene waste will generally float on water, while components such as metals sink.

Preferably the grinding step is performed so as to obtain the PCR in a flake form.

Selection of Component B being a Polyethylene Resin

The component B is a specific polyethylene resin selected to act as a booster, enhancing the properties of the resulting composition of polyethylene. In a preferred embodiment, component B is a virgin polyethylene resin or a blend of at least two virgin polyethylene resin. However, component B can be a polyethylene post-consumer resin or a blend of one or more virgin polyethylene resins and a polyethylene post-consumer resin.

For the process of the invention, the polyethylene resin (i.e. the component B) is selected to have a melt index (MI2) ranging from 0.5 to 3.5 g/10 min as determined according to ISO 1133-1:2011 at a temperature of 190° C. and under a load of 2.16 kg. In a preferred embodiment, the component B is a polyethylene resin having a melt index (MI2) ranging from 0.8 to 3.2 g/10 min as determined according to ISO 1133-1:2011 at a temperature of 190° C. and under a load of 2.16 kg; preferably ranging from 1.0 to 3.0 g/10 min and more preferably ranging from 1.2 to 2.8 g/10 min or from 1.5 to 2.6 g/10 min or from 1.6 to 2.4 g/10 min.

With preference, component B has an MI2 of at least 0.5 g/10 min as determined according to ISO 1133-1:2011 at a temperature of 190° C. and under a load of 2.16 kg; preferably, of at least 0.8 g/10 min; more preferably, of at least 1.0 g/10 min; and even more preferably, of at least 1.5 g/10 min or of at least 1.6 g/10 min.

Preferably, component B has an MI2 of at most 3.5 g/10 min as determined according to conditions D at a temperature of 190° C. and under a load of 2.16 kg; preferably of at most 3.2 g/10 min, more preferably of at most 3.0 g/10 min; even more preferably of at most 2.8 g/10 min; and most preferably of at most 2.6 g/10 min or of at most 2.4 g/10 min.

According to the invention, the polyethylene resin (i.e. the component B) is selected to have a density ranging from 0.940 to 0.965 g/cm³ as determined according to ISO 1183-1:2012 at 23° C. In a preferred embodiment, component B is a polyethylene resin having a density ranging from 0.942 to 0.960 g/cm³ as determined according to ISO 1183-1:2012 at 23° C.; preferably ranging from 0.945 to 0.957 g/cm³; more preferably, ranging from 0.947 to 0.955 g/cm³; and most preferably, ranging from 0.948 to 0.954 g/cm³ or from 0.944 to 0.953 g/cm³ or from 0.950 to 0.956 g/cm³.

With preference, component B has a density of at least 0.940 g/cm³ as determined according to ISO 1183-1:2012 at 23° C.; preferably of at least 0.942 g/cm³; more preferably of at least 0.945 g/cm³; even more preferably of at least 0.947 g/cm³; most preferably of at least 0.948 g/cm³; and even most preferably of at least 0.950 g/cm³.

Preferably, component B has density of at most 0.965 g/cm³ as determined according to ISO 1183-1:2012 at 23° C.; preferably of at most 0.962 g/cm³, more preferably of at most 0.960 g/cm³; even more preferably of at most 0.959 g/cm³, most preferably of at most 0.957 g/cm³, and even most preferably of at most 0.955 g/cm³ or of at most 0.954 g/cm³ or of at most 0.953 g/cm³.

Preferably, component B has a z average molecular weight (Mz) ranging from 100,000 g/mol to 300,000 g/mol as determined by gel permeation chromatography; preferably from 120,000 to 250,000 g/mol; more preferably from 140,000 to 220,000 g/mol; and most preferably from 150,000 to 200,000 g/mol or from 155,000 to 198,000 g/mol.

Preferably, component B has a z average molecular weight (Mz) of at least 100,000 g/mol as determined by gel permeation chromatography; preferably of at least 120,000 g/mol; more preferably of at least 140,000 g/mol; and most preferably of at least 150,000 g/mol or of at least 155,000 g/mol.

Preferably, component B has a z average molecular weight (Mz) of at most 300,000 g/mol as determined by gel permeation chromatography; preferably of at most 250,000 g/mol; more preferably of at most 220,000 g/mol; and most preferably of at most 200,000 g/mol or of at most 198,000 g/mol.

With preference, component B is a polyethylene resin a having weight-average molecular weight (Mw) ranging from 50,000 to 150,000 g/mol; as determined by gel permeation chromatography; preferably from 60,000 to 120,000 g/mol, more preferably from 65,000 to 100,000 g/mol; and even more preferably from 70,000 to 95,000 g/mol or from 65,000 to 87,000 g/mol.

With preference, component B is a polyethylene resin a having weight-average molecular weight (Mw) of at least 50,000 g/mol as determined by gel permeation chromatography; preferably of at least 60,000 g/mol; more preferably of at least 65,000 g/mol; and even more preferably of at least 68,000 g/mol and most preferably of at least 70,000 g/mol. With preference, component B is a polyethylene resin a having weight-average molecular weight (Mw) of at most 150,000 g/mol as determined by gel permeation chromatography; preferably of at most 120,000 g/mol; more preferably of at most 100,000 g/mol; and even more preferably of at most 95,000 g/mol and most preferably of at most 90,000 g/mol, or of at most 87,000 g/mol. In an embodiment, component B is a polyethylene resin having an Mz/Mw ranging from 1.5 to 5.0, preferably from 1.8 to 4.0 as determined by gel permeation chromatography; preferably from 2.0 to 3.5; more preferably from 2.2 to 3.2; and most preferably from 2.4 to 2.9.

In an embodiment, component B has a melting temperature as determined according to ISO 11357-3:2018 ranging from 122° C. to 135° C.; preferably ranging from 125° C. to 130° C.

In a preferred embodiment, component B is a polyethylene resin having a molecular weight distribution $M_w/M_n$ which is at most 10.0 as determined by gel permeation chromatography, with $M_w$ being the weight-average molecular weight and $M_n$ being the number average molecular weight; preferably at most 9.0; more preferably at most 8.0; even more preferably at most 7.0; most preferably at most 6.0; even most preferably at most 5.5, or at most 5.0, or at most 4.8.

In a preferred embodiment, component B is a polyethylene resin having a molecular weight distribution $M_w/M_n$ which is at least 2.0 as determined by gel permeation chromatography, with $M_w$ being the weight-average molecular weight and $M_n$ being the number average molecular weight; preferably at least 2.5; more preferably at least 3.0; even more preferably at least 3.5; most preferably at least 4.0 or at least 4.1.

In a preferred embodiment, component B is a polyethylene resin having a molecular weight distribution $M_w/M_n$ which is ranging from 2.0 to 10.0 as determined by gel permeation chromatography, more preferably ranging from 2.5 to 8.0, even more preferably from 3.0 to 7.0, and most preferably from 3.5 to 5.5.

In a preferred embodiment, the content of component B in the composition is at least 10 wt. % based on the total weight of the composition of polyethylene; preferably at least 15 wt. %; more preferably at least 20 wt. %; even more preferably at least 25 wt. %; most preferably at least 30 wt. %; even most preferably at least 35 wt. %; or at least 40 wt. %; or at least 45 wt. %, or at least 50 wt. %.

In a preferred embodiment, the content of component B in the composition is ranging from 15 wt. % to 80 wt. % based on the total weight of the composition of polyethylene; preferably ranging from 15 wt. % to 75 wt. %; more preferably ranging from 20 wt. % to 70 wt. %; even more preferably ranging from 20 wt. % to 65 wt. %; most preferably ranging from 30 wt. % to 60 wt. %; even most preferably ranging from 35 wt. % to 60 wt. %; even most preferably ranging from 35 wt. % to 55 wt. %; or ranging from 40 wt. % to 60 wt. %; or ranging from 45 wt. % to 70 wt. %.

The component B is preferably a polyethylene resin being a copolymer of ethylene and one or more alpha-olefin co-monomers selected from the group comprising $C_3$-$C_{20}$ alpha-olefins; preferably, $C_3$-$C_{12}$ alpha-olefins; more preferably, $C_4$-$C_8$ alpha-olefins; most preferably, the co-monomer is selected from 1-butene or 1-hexene; even most preferably the co-monomer is 1-hexene. In case the polyethylene resin is a copolymer of ethylene and one or more alpha-olefin co-monomers it comprises at least 0.1 wt. % of comonomer(s), preferably at least 1 wt. % as based on the total weight of the copolymer of ethylene and one or more alpha-olefin co-monomers as determined by $^{13}$C-NMR analysis. Preferably, it comprises up to 10 wt. % of comonomer(s) and most preferably up to 6 wt. % as determined by $^{13}$C-NMR analysis.

When the polyethylene resin (i.e. component B) is a virgin resin, it can be produced using any catalyst known in the art, such as chromium catalysts, Ziegler-Natta catalysts and metallocene catalysts.

The term "Ziegler-Natta catalyst" or "ZN catalyst" refers to catalysts having a general formula $M^1X_v$, wherein M1 is a transition metal compound selected from group IV to VII, wherein X is a halogen, and wherein v is the valence of the metal. Preferably, M1 is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Suitable ZN catalysts for use in the invention are described in U.S. Pat. Nos. 6,930,071 and 6,864,207, which are incorporated herein by reference. A preferred Ziegler-Natta catalyst system comprises a titanium compound having at least one titanium-halogen bond and an internal electron donor, both on a suitable support (for example on a magnesium halide in an active form), an organoaluminium compound (such as an aluminium trialkyl), and an optional external electron donor.

The term "chromium catalysts" refers to catalysts obtained by deposition of chromium oxide on a support, e.g. a silica or aluminium support. Illustrative examples of chromium catalysts comprise but are not limited to $CrSiO_2$ or $CrAl_2O_3$.

Preferably, the polyethylene resin is formed using at least one metallocene catalyst.

The term "metallocene catalyst" is used herein to describe any transition metal complexes comprising metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of the polymer.

In one embodiment of the present invention, the metallocene catalyst is a compound of formula (I) or (II)

(Ar)$_2$MQ$_2$ (I); or R"(Ar)$_2$MQ$_2$ (II), wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl (IND), tetrahydroindenyl (THI), and fluorenyl, wherein each of said groups may be optionally substituted with one or more substituents each independently selected from the group consisting of halogen, hydrosilyl, SiR$_3$ wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl, and P;

wherein M is a transition metal selected from the group consisting of titanium, zirconium, hafnium, and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl, and P; and wherein R" is a divalent group or moiety bridging the two Ar groups and selected from the group consisting of C$_1$-C$_{20}$ alkylene, germanium, silicon, siloxane, alkylphosphine, and an amine, and wherein said R" is optionally substituted with one or more substituents each independently selected from the group consisting of halogen, hydrosilyl, SiRs wherein R is a hydrocarbyl having 1 to 20 carbon atoms and a hydrocarbyl having 1 to 20 carbon atoms and wherein said hydrocarbyl optionally contains one or more atoms selected from the group comprising B, Si, S, O, F, Cl, and P.

Preferably, the metallocene comprises a bridged bis-indenyl and/or a bridged bis-tetrahydrogenated indenyl component. In some embodiments, the metallocene can be selected from one of the following formula (IIIa) or (IIIb):

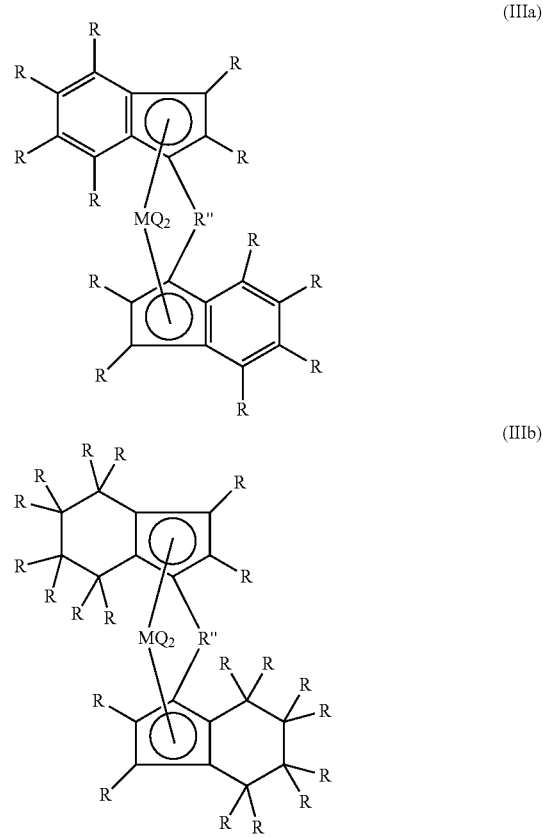

wherein each R in formula (IIIa) or (IIIb) is the same or different and is selected independently from hydrogen or XR'$_v$ in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls that comprises a C$_1$-C$_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal Group 4 of the Periodic Table or vanadium.

Each indenyl or tetrahydro indenyl component may be substituted with R in the same way or differently from one another at one or more positions of either of the fused rings. Each substituent is independently chosen.

If the cyclopentadienyl ring is substituted, its substituent groups must not be so bulky so as to affect the coordination of the olefin monomer to the metal M. Any substituents XR'y on the cyclopentadienyl ring are preferably methyl. More preferably, at least one and most preferably both cyclopentadienyl rings are unsubstituted.

In a particularly preferred embodiment, the metallocene comprises a bridged unsubstituted bis-indenyl and/or bis-tetrahydrogenated indenyl i.e. all R are hydrogens. More preferably, the metallocene comprises a bridged unsubstituted bis-tetrahydrogenated indenyl.

Illustrative examples of metallocene catalysts comprise but are not limited to bis(cyclopentadienyl) zirconium dichloride (Cp$_2$ZrCl2), bis(cyclopentadienyl) titanium dichloride (Cp$_2$TiCl$_2$), bis(cyclopentadienyl) hafnium dichloride (Cp$_2$HfCl$_2$); bis(tetrahydroindenyl) zirconium dichloride, bis(indenyl) zirconium dichloride, and bis(n-butyl-cyclopentadienyl) zirconium dichloride; ethylenebis (4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride. Most preferably the metallocene is ethylene-bis (tetrahydroindenyl) zirconium dichloride or ethylene-bis (tetrahydroindenyl) zirconium difluoride.

As used herein, the term "hydrocarbyl having 1 to 20 carbon atoms" refers to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

As used herein, the term "hydrocarboxy having 1 to 20 carbon atoms" refers to a moiety with the formula hydrocarbyl-O—, wherein the hydrocarbyl has 1 to 20 carbon atoms as described herein. Preferred hydrocarboxy groups are selected from the group comprising alkyloxy, alkenyloxy, cycloalkyloxy or aralkoxy groups.

As used herein, the term "alkyl", by itself or as part of another substituent, refers to straight or branched saturated hydrocarbon group joined by single carbon-carbon bonds having 1 or more carbon atoms, for example 1 to 12 carbon atoms, for example 1 to 6 carbon atoms, for example 1 to 4 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of alkyl groups are methyl, ethyl, propyl, isopropyl, butyl, isobutyl, sec-butyl, tert-butyl, 2-methylbutyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers. Alkyl groups have the general formula $C_nH_{2n+1}$.

As used herein, the term "cycloalkyl", by itself or as part of another substituent, refers to a saturated or partially saturated cyclic alkyl radical. Cycloalkyl groups have the general formula $C_nH_{2n-1}$. When a subscript is used herein following a carbon atom, the subscript refers to the number of carbon atoms that the named group may contain. Thus, examples of $C_{3-6}$cycloalkyl include cyclopropyl, cyclobutyl, cyclopentyl, or cyclohexyl.

As used herein, the term "aryl", by itself or as part of another substituent, refers to a radical derived from an aromatic ring, such as phenyl, naphthyl, indanyl, or 1,2,3,4-tetrahydro-naphthyl. When a subscript is used herein following a carbon atom, the subscript refers to the number of carbon atoms that the named group may contain.

As used herein, the term "alkylaryl", by itself or as part of another substituent, refers to an aryl group as defined herein, wherein a hydrogen atom is replaced by an alkyl as defined herein. When a subscript is used herein following a carbon atom, the subscript refers to the number of carbon atoms that the named group or subgroup may contain.

As used herein, the term "arylalkyl", by itself or as part of another substituent, refers to an alkyl group as defined herein, wherein a hydrogen atom is replaced by a aryl as defined herein. When a subscript is used herein following a carbon atom, the subscript refers to the number of carbon atoms that the named group may contain. Examples of $C_{6-10}$aryl$C_{1-6}$alkyl radicals include benzyl, phenethyl, dibenzylmethyl, methylphenylmethyl, 3-(2-naphthyl)-butyl, and the like.

As used herein, the term "alkylene", by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene (—CH$_2$—), ethylene (—CH$_2$—CH$_2$—), methylmethylene (—CH(CH$_3$)—), 1-methyl-ethylene (—CH(CH$_3$)—CH$_2$—), n-propylene (—CH$_2$—CH$_2$—CH$_2$—), 2-methylpropylene (—CH$_2$—CH (CH$_3$)—CH$_2$—), 3-methylpropylene (—CH$_2$—CH$_2$—CH (CH$_3$)—), n-butylene (—CH$_2$—CH$_2$—CH$_2$—CH$_2$—), 2-methylbutylene (—CH$_2$—CH(CH$_3$)—CH$_2$—CH$_2$—), 4-methylbutylene (—CH$_2$—CH$_2$—CH$_2$—CH(CH$_3$)—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers. When a subscript is used herein following a carbon atom, the subscript refers to the number of carbon atoms that the named group may contain. For example, $C_1$-$C_{20}$ alkylene refers to an alkylene having between 1 and 20 carbon atoms.

Exemplary halogen atoms include chlorine, bromine, fluorine and iodine, wherein fluorine and chlorine are preferred.

The metallocene catalysts used herein are preferably provided on a solid support. The support can be an inert organic or inorganic solid, which is chemically unreactive with any of the components of the conventional metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is a silica compound. In a preferred embodiment, the metallocene catalyst is provided on a solid support, preferably silica support. The silica may be in granular, agglomerated, fumed or other form.

In some embodiments, the support of the metallocene catalyst is a porous support, and preferably porous silica support.

Preferably, the supported metallocene catalyst is activated. The cocatalyst, which activates the metallocene catalyst component, can be any cocatalyst known for this purpose such as an aluminium-containing cocatalyst, a boron-containing cocatalyst or a fluorinated catalyst. The aluminium-containing cocatalyst may comprise an alumoxane, an alkyl aluminium, a Lewis acid and/or fluorinated catalytic support.

In some embodiments, alumoxane is used as an activating agent for the metallocene catalyst. The alumoxane can be used in conjunction with a catalyst in order to improve the activity of the catalyst during the polymerization reaction.

As used herein, the term "alumoxane" and "aluminoxane" are used interchangeably and refer to a substance, which is capable of activating the metallocene catalyst. In some embodiments, alumoxanes comprise oligomeric linear and/ or cyclic alkyl alumoxanes. In a further embodiment, the alumoxane has formula (IV) or (V)

$R^a$—(Al($R^a$)—O)$_x$-AlR$_2^a$ (IV) for oligomeric, linear alumoxanes; or (—Al($R^a$)—O—)$_y$ (V) for oligomeric, cyclic alumoxanes wherein x ranges from 1 to 40, and preferably from 10 to 20;

wherein y ranges from 3 to 40, and preferably from 3 to 20; and wherein each $R^a$ is independently selected from a $C_1$-$C_8$alkyl, and preferably is methyl. In a preferred embodiment, the alumoxane is methylalumoxane (MAO).

In a preferred embodiment, the metallocene catalyst used is a supported metallocene-alumoxane catalyst comprising a metallocene and an alumoxane which are bound on a porous silica support. Preferably, the metallocene catalyst is a bridged bis-indenyl catalyst and/or a bridged bis-tetrahydrogenated indenyl catalyst.

One or more aluminiumalkyl represented by the formula AlR$_x^b$ can be used as additional co-catalyst, wherein each RD is the same or different and is selected from halogens or from alkoxy or alkyl groups having from 1 to 12 carbon atoms and x ranges from 1 to 3. Non-limiting examples are tri-ethyl aluminum (TEAL), tri-iso-butyl aluminum (TIBAL), tri-methyl aluminum (TMA), and methyl-methylethyl aluminum (MMEAL). Especially suitable are trialkylaluminiums, the most preferred being triisobutylaluminium (TIBAL) and triethylaluminum (TEAL).

With preference, the polyethylene resin has a multimodal molecular weight distribution and preferably a bimodal molecular weight distribution.

As used herein, the term "polyethylene with a bimodal molecular weight distribution" or "bimodal polyethylene" refers to polyethylene having a distribution curve being the sum of two unimodal molecular weight distribution curves, and refers to a polyethylene product having two distinct but possibly overlapping populations of polyethylene macromolecules each having different weight average molecular weights. By the term "polyethylene with a multimodal molecular weight distribution" or "multimodal polyethylene" it is meant polyethylene with a distribution curve is the sum of at least two, preferably more than two unimodal distribution curves, and refers to a polyethylene product having two or more distinct but possibly overlapping populations of polyethylene macromolecules each having different weight average molecular weights. The multimodal polyethylene resin can have an "apparent monomodal" molecular weight distribution, which is a molecular weight distribution curve with a single peak and no shoulder. Nevertheless, the polyethylene resin will still be multimodal if it comprises two distinct populations of polyethylene macromolecules each having a different weight average molecular weights, as defined above, for example when the two distinct populations were prepared in different reactors and/or under different conditions.

The polyethylene resin may be produced by gas, slurry or solution phase process in one or several reactors connected to each other in series. Preferably the polyethylene is produced in two or more serially connected reactors. Slurry polymerization is preferably used, preferably in a slurry loop reactor or a continuously stirred reactor.

Preferably, the polyethylene resin is produced in two or more serially connected reactors, comprising at least one first reactor and at least one second reactor, preferably loop reactors, more preferably slurry loop reactors. The polyethylene is produced in at least two serially connected slurry loop reactors, preferably in a double loop reactor.

The polymerization temperature can range from 20° C. to 125° C., preferably from 55° C. to 105° C., more preferably from 60° C. to 100° C. and most preferably from 65° C. to 98° C. Preferably, the temperature range may be within the range from 75° C. to 100° C. and most preferably from 78° C. to 98° C. The polymerization pressure can range from 2 MPa to 10 MPa, preferably from 3 MPa to 5 MPa, and more preferably from 3.7 MPa to 4.5 MPa.

In a preferred embodiment the component B is a polyethylene resin comprising at least two polyethylene fractions B1 and B2, wherein fraction B1 has MI2 of at least 200 g/10 min or of at least 250 g/min as determined according to ISO 1133-1:2011 at a temperature of 190° C. and under a load of 2.16 kg and/or a density of at least 0.960 g/cm$^3$ or of at least 0.970 g/cm$^3$ as determined according to ISO 1183-1:2012 at 23° C.

With preference, fraction B1 has an MI2 ranging from 200 to 500 g/10 min as determined according to ISO 1133-1:2011 at a temperature of 190° C. and under a load of 2.16 kg; preferably ranging from 220 to 450 g/10 min; more preferably ranging from 240 to 420 g/10 min; even more preferably ranging from 250 to 400 g/10 min; and most preferably ranging from 270 to 350 g/10 min.

With preference, fraction B1 has a density ranging from 0.960 to 0.980 g/cm$^3$ as determined according to ISO 1183-1:2012 at 23° C.; preferably ranging from 0.965 to 0.978 g/cm$^3$; more preferably ranging from 0.970 to 0.976 g/cm$^3$, or ranging from 0.968 to 0.975 g/cm$^3$.

In a preferred embodiment, component B comprises from 30 to 60 wt. % of fraction B1 based on the total weight of component B; preferably from 40 to 50 wt. %

With preference, fraction B1 is a polyethylene homopolymer.

In a preferred embodiment; the step of providing the component B comprises the sub-steps of preparing the component B, wherein component B comprises at least two polyethylene fractions B1 and B2; with the fraction B1 having an MI2 of at least 200 g/10 min or of at least 250 g/10 min as determined according to ISO 1133-1:2011 at a temperature of 190° C. and under a load of 2.16 kg and/or a density of at least 0.960 g/cm$^3$ or of at least 0.970 g/cm$^3$ as determined according to ISO 1183-1:2012 at 23° C., the sub-steps comprising:

feeding ethylene monomer, a diluent, at least one catalyst, optionally hydrogen, and optionally one or more alpha-olefin comonomers into at least one first reactor, polymerizing the ethylene monomer and optionally one or more alpha-olefin co-monomers, in the presence of the catalyst and optional hydrogen, in said first reactor to produce a polyethylene fraction B1; and feeding the polyethylene fraction B1 to a second reactor serially connected to the first reactor, and in the second reactor, polymerizing ethylene and optionally one or more alpha-olefin co-monomers, in the presence of the polyethylene fraction B1 and optionally hydrogen to produce the polyethylene resin of component B.

With preference, the one or more alpha-olefin co-monomers are selected from the group comprising $C_3$-$C_{20}$ alpha-olefins; preferably $C_3$-$C_{12}$ alpha-olefins; more preferably $C_4$-$C_8$ alpha-olefins; most preferably, the co-monomer is selected from 1-butene or 1-hexene; even most preferably the co-monomer is 1-hexene.

The melt flow index (MI2) of the polyethylene produced in the second reactor is calculated using the following equation (1):

$$\text{Log }(MI2_{final}) = w_{B1} \times (\text{Log } MI2_{B1}) + w_{B2} \times \text{Log }(MI2_{B2}) \quad (1)$$

wherein MI2 final is the melt flow index of the total polyethylene produced, $MI2_{B1}$ and $MI2_{B2}$ are the respective melt flow index of the polyethylene fractions produced in the first and the second polymerization loop reactors, and $W_{B1}$ and $W_{B2}$ are the respective weight fractions of the polyethylene produced in the first and in the second polymerization loop reactors as expressed in weight percent (wt. %) of the total polyethylene produced in the two polymerization loop reactors. These weight fractions are also commonly described as the contribution by the respective loop.

Selection of the One or More Antioxidants

The Composition of Polyethylene Comprises One or More Antioxidants.

In preferred embodiment, the one or more antioxidants comprise at least one phenolic antioxidant and/or at least one organic phosphite or phosphonite antioxidant.

With preference, the composition of polyethylene comprises from 100 ppm of the one or more antioxidants based on the total weight of the composition of polyethylene; preferably at least 150 ppm, more preferably at least 200 ppm; even more preferably at least 250 ppm and most preferably at least 300 ppm.

With preference, the composition of polyethylene comprises from 100 to 5000 ppm of the one or more antioxidants based on the total weight of the composition of polyethylene; preferably from 150 to 4000 ppm; more preferably from 200 to 3000 ppm; even more preferably from 250 to 2500 ppm; and most preferably from 300 to 2000 ppm.

In preferred embodiment, the one or more antioxidants are or comprise one or more phenolic antioxidants selected from octadecyl 3-(3',5'-di-t-butyl-4-hydroxyphenyl)propionate and/or pentaerythrityl-tetrakis(3-(3',5'-di-t-butyl-4-hydroxyphenyl)propionate.

With preference, the composition of polyethylene comprises from 100 ppm of one or more phenolic antioxidants based on the total weight of the composition of polyethylene; preferably at least 150 ppm, more preferably at least 200 ppm; even more preferably at least 250 ppm and most preferably at least 300 ppm.

The composition of polyethylene comprises from 100 to 5000 ppm based on the total weight of the composition of polyethylene of one or more phenolic antioxidants selected from octadecyl 3-(3',5'-di-t-butyl-4-hydroxyphenyl)propionate and/or pentaerythrityl-tetrakis(3-(3',5'-di-t-butyl-4-hydroxyphenyl)propionate; preferably from 150 to 4000 ppm; more preferably from 200 to 3000 ppm; even more preferably from 250 to 2500 ppm; and most preferably from 300 to 2000 ppm.

In preferred embodiment, the one or more antioxidants are or comprise at least one organic phosphite or phosphonite antioxidant selected from tris(2,4-ditert-butylphenyl) phosphite, bis(2,4-di-tert-butyl-6-methylphenyl)-ethyl-phosphite, tris-nonylphenyl phosphite, tetrakis-(2,4-di-t-butylphenyl)-4,4'-biphenylen-di-phosphonite, 2,4,6-Tri-tert-butylphenyl 2-butyl-2-ethyl-1,3-propanediol phosphite and any blend thereof.

With preference, the composition of polyethylene comprises from 100 ppm of one or more organic phosphite or phosphonite antioxidants based on the total weight of the composition of polyethylene; preferably at least 150 ppm, more preferably at least 200 ppm; even more preferably at least 250 ppm and most preferably at least 300 ppm The composition of polyethylene comprises from 100 to 5000 ppm based on the total weight of the composition of polyethylene of one or more organic phosphite or phosphonite antioxidants selected from tris(2,4-ditert-butylphenyl) phosphite (CAS number 31570-04-4, Irgaphos 168®), bis(2,4-di-tert-butyl-6-methylphenyl)-ethyl-phosphite (Irgafos 38®), tris-nonylphenyl phosphite (CAS number 26523-78-4), tetrakis-(2,4-di-t-butylphenyl)-4,4'-biphenyl-di-phosphonite (CAS number 119345-01-6, Irgafos P-EPQ®). 2,4,6-tri-tert-butylphenyl 2-butyl-2-ethyl-1,3-propanediol phosphite (CAS number 161717-32-4, Ultranox 641®), or a blend thereof; preferably from 150 to 4000 ppm; more preferably from 200 to 3000 ppm; even more preferably from 250 to 2500 ppm; and most preferably from 300 to 2000 ppm.

In an embodiment, the one or more antioxidants comprise one or more selected from pentaerythritol tetrakis [3-(3',5'-di-tert-butyl-4'-hydroxyphenyl)propionate]; tris(2,4-ditert-butylphenyl) phosphite and/or octadecyl 3-(3,5-di-tert-butyl-4-hydroxyphenyl)propionate.

In an embodiment, the one or more antioxidants comprise at least two selected from pentaerythritol tetrakis [3-(3',5'-di-tert-butyl-4'-hydroxyphenyl)propionate], tris(2,4-ditert-butylphenyl) phosphite and octadecyl 3-(3,5-di-tert-butyl-4-hydroxyphenyl)propionate.

Pentaerythritol tetrakis[3-(3',5'-di-tert-butyl-4'-hydroxyphenyl)propionate] is commercially available as Irganox® 1010 by BASF. Tris(2,4-ditert-butylphenyl) phosphite is commercially available as Irgafos® 168 by BASF. Octadecyl 3-(3,5-di-tert-butyl-4-hydroxyphenyl)propionate is commercially available as Irganox® 1076 by BASF.

Other Additives

In a preferred embodiment, the composition of polyethylene comprises additives, such as slip agents and/or ultraviolet absorbers.

Therefore, in a preferred embodiment, the process further comprises a step of adding at least one slip agent selected from erucamide (i.e. cis-13-docosenoamide, CAS number 112-84-5), behenamide (i.e. docosanamide, CAS number 3061-75-4) or any mixture thereof to the composition of polyethylene.

When the composition of polyethylene comprises at least one slip agent, said at least one slip agent is present in a content of at least 300 ppm based on the total weight of the composition of polyethylene; preferably of at least 400 ppm; more preferably of at least 500 ppm; even more preferably, of at least 600 ppm; most preferably of at least 700 ppm, and even most preferably, of at least 800 ppm, or of at least 900 ppm. In preferred embodiment, said at least one slip agent is present in a content of at most 4000 ppm based on the total weight of the composition of polyethylene; preferably, of at most 3000 ppm; preferably, of at most 2500 ppm, or of at most 2000 ppm, or of at most 1050 ppm, or of at least 1000 ppm.

In another preferred embodiment, the process further comprises a step of adding at least one ultraviolet absorber selected from the hydroxyphenylbenzotriazole class to the composition of polyethylene.

In an embodiment, the composition of polyethylene comprises at least 500 ppm based on the total weight of the composition of polyethylene of at least one ultraviolet absorber, which is preferably selected from the hydroxyphenylbenzotriazole class. Preferably, the composition of polyethylene comprises at least 600 ppm of at least one ultraviolet absorber based on the total weight of the composition of polyethylene; more preferably at least 700 ppm; and/or at most 4000 ppm, preferably at most 3000 ppm, more preferably at most 2000 ppm, and even more preferably at most 1000 ppm.

In an embodiment, the ultraviolet absorber is selected from the hydroxyphenylbenzotriazole class consisting of 2-(3-t-butyl-2-hydroxy-5-methylphenyl)-5-chlorobenzotriazole, 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl)benzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis(α,α-dimethylbenzyl)phenyl]-2H-benzotriazole, 2-[(3'-t-butyl-2'-hydroxyphenyl)-5'-(2-octyloxycarbonylethyl)phenyl]-5-chlorobenzotriazole, 2-[3'-t-butyl-5'-[2-(2-ethylhexyloxy)carbonylethyl]-2'-hydroxyphenyl]-5-chlorobenzotriazole, 2-[3'-t-butyl-2'-hydroxy-5'-(2-methoxycarbonylethyl)phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5-(2-octyloxycarbonylethyl)phenyl] benzotriazole, 2-[3'-t-butyl-2'-hydroxy-5'-[2-(2-ethylhexyloxy)carbonylethyl]phenyl]benzotriazole. 2-[2-hydroxy-3-(3,4,5,6-tetrahydrophthalimidemethyl)-5-methylphenyl]benzotriazole, 2-(3,5-di-t-butyl-2-hydroxyphenyl)-5-chlorobenzotriazole; a mixture of 2-(3'-dodecyl-2'-hydroxy-5'-methylphenyl)benzotriazole and 2-[3'-t-butyl-2'-hydroxy-5'-(2-isooctyloxycarbonylethyl) phenyl]benzotriazole; 2,2'-methylenebis[6-(2H-benzotriazol-2-yl)-4-(1,1,3,3-tetramethylbutyl)phenol, 2,2'-methylenebis[4-t-butyl-6-(2H-benzotriazol-2-yl)phenol]; a condensate of poly(3 to 11)(ethylene glycol) with 2-[3'-t-butyl-2'-hydroxy-5'-(2-methoxycarbonylethyl)phenyl]benzotriazole, a condensate of poly(3 to 11)(ethylene glycol) with methyl 3-[3-(2H-benzotriazol-2-yl)-5-t-butyl-4-hydroxyphenyl]propionate; 2-ethylhexyl-3-[3-t-butyl-5-(5-chloro-2H-benzotriazol-2-yl)-4-hydroxyphenyl]propionate, octyl 3-[3-t-butyl-5-(5-chloro-2H-benzotriazol-2-yl)-4-hydroxyphenyl]propionate, methyl 3-[3-t-butyl-5-(5-chloro-2H-benzotriazol-2-yl)-4-hydroxyphenyl]propionate, 3-[3-t-butyl-5-(5-chloro-2H-benzotriazol-2-yl)-4-hydroxyphenyl] propionic acid and mixtures thereof.

Preferably, the ultraviolet absorber is 2-(3-t-butyl-2-hydroxy-5-methylphenyl)-5-chlorobenzotriazole (CAS number. 3896-11-05), commercially available under the denomination Tinuvin® 326.

The resin composition may further contain additives, in particular additives suitable for injection and compression moulding, such as, processing aids, mould-release agents, acid scavengers, flame retardants, fillers, nanocomposites, lubricants, antistatic additives, nucleating/clarifying agents, antibacterial agents, plasticizers, colorants/pigments/dyes and any mixtures thereof. Illustrative pigments or colorants include titanium dioxide, carbon black, cobalt aluminum oxides such as cobalt blue, and chromium oxides such as chromium oxide green. Pigments such as ultramarine blue, phthalocyanine blue and iron oxide red are also suitable. Specific examples of additives include lubricants and mould-release agents such as calcium stearate, zinc stearate and nucleating agents such as Milliken HPN20E™, and hindered amine light stabilizers (HALS) such as those taught for instance in U.S. Pat. Nos. 5,004,770; 5,204,473; 5,096, 950; 5,300,544; 5,112,890; 5,124,378; 5,145,893; 5,216, 156; 5,844,026; 5,980,783; 6,046,304; 6,117,995; 6,271, 377; 6,297,299; 6,392,041; 6,376,584 and 6,472,456. The contents of these U.S. Patents are incorporated by reference. These additives may be included in amounts effective to impart the desired properties.

An overview of the additives that can be used in the injection- or compression-moulded articles of the present invention may be found in Plastics Additives Handbook, ed. H. Zweifel, 5th edition, 2001, Hanser Publishers.

The Composition of Polyethylene

The process according to the invention results in a composition which can be defined as follows.

The composition of polyethylene has a melt index (MI2) ranging from 1.0 to 3.2 g/10 min as determined according to ISO 1133-1:2011 at a temperature of 190° C. and under a load of 2.16 kg; preferably ranging from 1.1 to 3.1 g/10 min, or ranging from 1.2 to 2.9 g/10 min, more preferably ranging from 1.3 to 2.8 g/10 min; even more preferably ranging from 1.5 to 2.6 g/10 min, or ranging from 1.6 to 2.5 g/10 min; and most preferably ranging from 1.8 to 2.4 g/10 min.

With preference, the composition of polyethylene has an MI2 of at least 0.8 g/10 min as determined according to ISO 1133-1:2011 at a temperature of 190° C. and under a load of 2.16 kg; preferably of at least 0.9 g/10 min; more preferably of at least 1.0 g/10 min; even more preferably of at least 1.2 g/10 min; most preferably of at least 1.3 g/10 min; and even most preferably of at least 1.5 g/10 min, or of at least 1.6 g/10 min, or of at least 1.8 g/10 min.

Preferably, the composition of polyethylene has an MI2 of at most 3.2 g/10 min as determined according to conditions D at a temperature of 190° C. and under a load of 2.16 kg; preferably of at most 3.1 g/10 min, more preferably of at most 3.0 g/10 min; even more preferably of at most 2.9 g/10 min, most preferably of at most 2.8 g/10 min, and even most preferably of at most 2.7 g/10 min or of at most 2.6 g/10 min or of at most 2.5 g/10 min or of at most 2.4 g/10 min.

The composition of polyethylene has a density ranging from 0.940 to 0.965 g/cm$^3$ as determined according to ISO 1183-1:2012 at 23° C.; preferably ranging from 0.940 to 0.960 g/cm$^3$ or from 0.942 to 0.959 g/cm$^3$; or ranging from 0.945 to 0.959 g/cm$^3$; more preferably ranging from 0.949 to 0.958 g/cm$^3$; and most preferably ranging from 0.951 to 0.957 g/cm$^3$.

With preference, the composition of polyethylene has a density of at least 0.940 g/cm$^3$ as determined according to ISO 1183-1:2012 at 23° C.; preferably of at least 0.942 g/cm$^3$; more preferably of at least 0.945 g/cm$^3$; even more preferably of at least 0.947 g/cm$^3$; most preferably of at least 0.949 g/cm$^3$; and even most preferably of at least 0.950 g/cm$^3$, or of at least 0.951 g/cm$^3$.

Preferably, the composition of polyethylene has density of at most 0.965 g/cm$^3$ as determined according to ISO 1183-1:2012 at 23° C.; preferably of at most 0.963 g/cm$^3$, more preferably of at most 0.962 g/cm$^3$; even more preferably of at most 0.961 g/cm$^3$, most preferably of at most 0.960 g/cm$^3$, and even most preferably of at most 0.959 g/cm$^3$ or of at most 0.958 g/cm$^3$ or of at most 0.957 g/cm$^3$.

As it contains recycled material, the composition of polyethylene may comprise from 0.01 to 15.0 wt. % of polypropylene based on the total weight of the composition of polyethylene; preferably from 0.1 to 13.5 wt. %; more preferably from 0.5 to 10.0 wt. % even more preferably from 0.7 to 8 wt. %, and most preferably from 1.0 to 5.0 wt. %.

In a preferred embodiment, the composition of polyethylene is having a z average molecular weight (Mz) ranging from 200,000 g/mol to 390,000 g/mol as determined by gel permeation chromatography; preferably from 220,000 to 380,000 g/mol or from 250,000 to 378,000 g/mol; more preferably from 260,000 to 375,000 g/mol; even more preferably from 265,000 to 370,000 g/mol; and most preferably from 270,000 to 367,000 g/mol.

In a preferred embodiment, the composition of polyethylene is having a z average molecular weight (Mz) of at least 200,000 g/mol as determined by gel permeation chromatography; preferably of at least 220,000 g/mol; more preferably of at least 240,000 g/mol; and most preferably of at least 250,000 g/mol or of at least 260,000 g/mol or of at least 265,000 g/mol or of at least 270,000 g/mol.

Preferably, the composition of polyethylene is having a z average molecular weight (Mz) of at most 450,000 g/mol as determined by gel permeation chromatography; preferably of at most 390,000 g/mol; more preferably of at most 380,000 g/mol; and most preferably of at most 378,000 g/mol, or of at most 375,000 g/mol, or of at most 370,000 g/mol, or of at most 367,000 g/mol.

With preference, the composition of polyethylene has a weight-average molecular weight (Mw) of at least 50,000 g/mol as determined by gel permeation chromatography; preferably ranging from 50,000 to 150,000 g/mol; more preferably from 60,000 to 120,000 g/mol, more preferably from 65,000 to 100,000 g/mol; and even more preferably from 70,000 to 95,000 g/mol or from 65,000 to 87,000 g/mol.

In an embodiment, the composition of polyethylene has an Mz/Mw ranging from 3.0 to 6.0 as determined by gel permeation chromatography; preferably from 3.2 to 5.5; more preferably from 3.5 to 5.3; and most preferably from 4.0 to 5.0.

In an embodiment, the composition of polyethylene has an Mw/Mn of at least 2.0 as determined by gel permeation chromatography; preferably ranging from 2.0 to 8.0; more preferably ranging from 3.0 to 7.0; even more preferably, ranging from 4.0 to 6.5; and most preferably ranging from 4.3 to 6.2; and even most preferably ranging from 4.5 to 6.0. or ranging from 4.6 to 5.9.

The invention provides the use of a composition of polyethylene as described above for the manufacture of a cap or closure; with preference, by injection moulding or compression moulding.

Caps or Closures and Process of Manufacture

The invention provides caps or closures made of a composition of polyethylene as defined above; with preference, the cap or closure is a screw cap.

The invention also provides a process for the production of caps or closures, said process comprising the steps of:
 producing a composition of polyethylene comprising post-consumer resin (PCR) according to the process of the first aspect; and
 injection moulding or compression moulding of the composition of polyethylene into a cap or closure.

The caps or closures of the present invention can be prepared by injection moulding or compression moulding the resin composition as already defined herein-above. Preferably, the caps or closures are prepared by injection moulding. Any injection machine known in the art may be used in the present invention, such as for example ENGEL 125T or NETSTAL Synergy 1000 injection moulding machine.

All mould types may be used. The caps or closures of the present invention are particularly suitable for closing bottles, in particular bottles for carbonated or still drinks or for non-food bottles such us for lubricant agrochemicals. Advantageously, the resin used in the invention is particularly suitable for single-piece caps or closures, including screw caps.

The injection moulding cycle may be split into three stages: filling, packing-holding, and cooling. During filling, melt polymer is forced into an empty cold cavity; once the cavity is filled; extra material is packed inside the cavity and held under high pressure in order to compensate for density increase during cooling. The cooling stage starts when the cavity gate is sealed by polymer solidification; further temperature decreases and polymer crystallization takes place during the cooling stage. Typical temperatures for the filling step are from 160° C. to 280° C., preferably from 180° C. to 260° C., preferably from 200° C. to 230° C. Injection-moulding, as used herein, is performed using methods and equipment well known to the person skilled in the art. An overview of injection moulding and compression moulding is, for example, given in Injection Moulding Handbook, D. V. Rosato et al., 3rd edition, 2000, Kluwer Academic Publishers.

The moulds used in the production of the present caps or closures may be any mould usually used in the production of caps or closures, such as for example multi-cavity moulds wherein a number of caps or closures is produced simultaneously.

The caps or closures of the present application are not especially limited. They may include screw-caps, caps or closures with a living hinge, glossy caps or closures, transparent caps or closures.

The caps or closures of the present application may be used in various packaging applications, such as for example detergent packaging, cosmetic packaging or paint packaging. Examples in detergent packaging are caps or closures for washing powders, dish soap, household cleaners. Examples in cosmetic packaging are shower gels, shampoos, oils, creams, liquid soaps. Examples in medical packaging are packaging for pills, solutions, disinfectants.

Hence, the present invention encompasses a packaging comprising the above-defined caps or closures.

Test Methods

The density was measured according to the method of standard ISO 1183-1:2012 (immersion method) at a temperature of 23° C.

The melt index MI2 was measured according to the method of standard ISO 1133-1:2011 at 190° C. and under a load of 2.16 kg.

The molecular weight distribution (MWD) is the ratio of the weight average molecular weight Mw to the number average molecular weight Mn i.e. Mw/Mn. The molecular weight ($M_n$ (number average molecular weight), $M_w$ (weight average molecular weight) and molecular weight distributions D (Mw/Mn) were determined by size exclusion chromatography (SEC) and in particular by gel permeation chromatography (GPC). Briefly, a GPC-IR5 from Polymer Char was used: 10 mg polyethylene sample was dissolved at 160° C. in 10 ml of trichlorobenzene for 1 hour. Injection volume: about 400 µl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})$= 0.965909×$\log_{10}$(MPS)−0.28264) (cut off on the low molecular weight end at $M_{PE}$=1000).

The molecular weight averages used in establishing molecular weight/property relationships are the number average ($M_n$), weight average ($M_w$) and z average ($M_z$) molecular weight. These averages are defined by the following expressions and are determined from the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The molecular weight distribution (MWD) is then calculated as Mw/Mn.

The $^{13}$C-NMR analysis is performed using a 400 MHz or 500 MHz Bruker NMR spectrometer under conditions such that the signal intensity in the spectrum is directly proportional to the total number of contributing carbon atoms in the sample. Such conditions are well known to the skilled person and include for example sufficient relaxation time etc. In practice the intensity of a signal is obtained from its integral, i.e. the corresponding area. The data is acquired using proton decoupling, 2000 to 4000 scans per spectrum with 10 mm room temperature through or 240 scans per spectrum with a 10 mm cryoprobe, a pulse repetition delay of 11 seconds and a spectral width of 25000 Hz (+/−3000 Hz). The sample is prepared by dissolving a sufficient amount of polymer in 1,2,4-trichlorobenzene (TCB, 99%, spectroscopic grade) at 130° C. and occasional agitation to homogenise the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 200 mg to 600 mg of polymer are dissolved in 2.0 mL of TCB, followed by addition of 0.5 mL of $C_6D_6$ and 2 to 3 drops of HMDS.

Following data acquisition, the chemical shifts are referenced to the signal of the internal standard HMDS, which is assigned a value of 2.03 ppm.

The comonomer content of a polyethylene is determined by $^{13}$C-NMR analysis of pellets according to the method described by G. J. Ray et al. in Macromolecules, vol. 10, n° 4, 1977, p. 773-778.

The melting temperature (Tm) was determined according to ISO 11357-3:2018.

The environmental stress crack resistance (Bell ESCR) was determined according to ASTM D1693-15, conditions B at 50° C. using 100% Igepal® CO-630 as a chemical agent (wherein Igepal® CO-630 (CAS number 68412-54-4) is commercially available from Rhodia). In the test, 10 notched strips of molded PE were bent and contacted with a surfactant being 100% Igepal at 50° C. The failures were tracked by regular camera snapshots. Size of the strips 1.30 cm×3.80 cm×1.84-1.97 mm) Notch size: 0.3-0.4 mm depth×1.25 cm length. The ESCR value is reported as F50, the calculated 50 percent failure time from the probability graph.

The closure (cap) environmental stress crack resistance (Cap-ESCR) was measured at 40° C., 2 bar air pressure using 10% Igepal® CO-630 as a chemical agent (wherein Igepal® CO-630 (CAS number 68412-54-4) is commercially available from Rhodia) on closures. Closures were prepared by injection-moulding using a Netstal Elion 3200 apparatus. A temperature controlled chamber was set to 40° C. Closures were clamped to pre-formed injection-moulded bottles by tightening the closures at a tightening torque of 2.2 Nm. The bottle part of the assembly is outfitted with tubing that is then attached to an air supply of the controlled chamber. The bottles with closures are turned upside down and immersed with a 10% Igepal® CO-630 solution. The pressure inside the assembly is then monitored until a crack develops on the closure. The time it takes for a crack to develop is recorded. The ESCR value is reported as F50.

The tensile modulus was determined according to ISO 527-1:2012 at 23° C. using specimen type 1A.

The stress at yield was determined according to ISO 527-1:2012 at 23° C. using specimen type 1A

EXAMPLES

The invention will now be illustrated by the following, non-limiting illustrations of particular embodiments of the invention.

Example 1—Selection of the Materials

The following materials were selected to perform the experiments.

TABLE 1 component B: polyethylene booster

| PE | unit | PE1 |
|---|---|---|
| MI2 (190° C./2.16 kg) | g/10 min | 1.9 |
| Density (23° C.) | g/cm$^3$ | 0.952 |
| Mn | g/mol | 15,967 |
| Mw | g/mol | 71,919 |
| Mz | g/mol | 185,578 |
| Mw/Mn | | 4.5 |
| Mz/Mw | | 2.6 |
| Melting point (Tm) | ° C. | 128.8 |

PE1 is metallocene-catalyzed and has a bimodal molecular weight distribution. PE1 is a co-polymer of ethylene and 1-hexene. PE1 is a bimodal high-density polyethylene commercially available from TOTAL, used for cap and closures and produced with a metallocene catalyst in two sequentially connected slurry loop reactors, having a density of about 0.952 g/cm$^3$, a MI2 ranging from 2.0 g/10 min+/−0.2 and a MWD of about 4.5.

The polyethylene PE1 has been produced according to the below conditions of polymerization with the catalyst being the metallocene catalyst ethylene-bis(tertrahydroindenyl) zirconium dichloride, which was added in the first reactor only. The cocatalyst used was tri-iso-butyl aluminum (TIBAL).

TABLE 2

| parameter | unit | |
|---|---|---|
| First reactor | | |
| Temperature first reactor | ° C. | 95.0 |
| Pressure | bar | 40 |
| diluent | | isobutane |
| C6 Feed | Kg/h | 0 |
| C6/C2 feed | Kg/T | 0 |
| Fraction first reactor | wt. % | 48.5 |
| Density first reactor | g/cm$^3$ | 974.0 |
| MI2 first reactor | g/10 min | 293 |

TABLE 2-continued

| parameter | unit | |
| --- | --- | --- |
| Second reactor | | |
| Temperature | °C. | 90 |
| Pressure | bar | 40 |
| diluent | | isobutane |
| C6/C2 feed | Kg/T | 61 |
| Density final (fluff) | g/cm³ | 952.3 |
| MI2 final (fluff) | g/10 min | 2.1 |

After pelletization, the final density was 952.3 g/cm³ and the final MI2 was 1.8 g/10 min.

Example 2: The Compositions of Polyethylene

Several blends were produced. Composition and properties of the blends are given in the below tables 3 and 4. The blends were produced by extrusion before injection.

TABLE 3

| Compositions | unit | Blend 1 | Blend 2 | Blend 3 |
| --- | --- | --- | --- | --- |
| Properties of the blend | | | | |
| MI2 (190° C./2.16 kg) | g/10 min | 2.4 | 2.0 | 1.8 |
| Density (23° C.) | g/cm³ | 0.9562 | 0.9537 | 0.9544 |
| Mn | g/mol | 15,607 | 14,331 | 14,385 |
| Mw | g/mol | 75,704 | 84,105 | 82,484 |
| Mz | g/mol | 295,231 | 352,989 | 349,768 |
| Mw/Mn | | 4.9 | 5.9 | 5.7 |
| Mz/Mw | | 3.9 | 4.2 | 4.2 |
| Melting point (Tm) | °C. | 130.4 | 130.1 | 129.6 |
| Tensile modulus | MPa | 1145 | 1085 | 1109 |
| stress at yield | MPa | 26.9 | 26.1 | 26.3 |
| Bell ESCR 100% Igepal ® - 50° C. | | | | |
| Average failure time F50 | hrs | 14 | 57 | 105 |
| Failure min/max | hrs | 10/26 | 24/97 | 56/180 |

TABLE 4

| Compositions | unit | Blend 1 | Blend 2 | Blend 3 |
| --- | --- | --- | --- | --- |
| Composition of the blends | | | | |
| PCR-PE (Comp A) | | PCR-PE1 | PCR-PE2 | PCR-PE3 |
| PCR-PE (Comp A) | wt. % | 50 | 50 | 50 |
| PE (Comp B) | | PE1 | PE1 | PE1 |
| PE (Comp B) | wt. % | 50 | 50 | 50 |
| Irgafos 168 | ppm | 339 | 505 | 390 |
| Irgafos 168 oxide | ppm | 485 | 469 | 571 |
| Irganox 1010 | ppm | 407 | 345 | 252 |
| Irganox 1076 | ppm | 56 | — | — |
| Tunivin 326 | ppm | 43 | — | — |
| PP (as determined by RMN) | Wt. % | 2 | 4 | 1 |
| Processing conditions | | | | |
| temperature | °C. | 220 | 220 | 220 |
| Injection pressure | bar | 1408 | 1415 | 1411 |
| Holding pressure | bar | 600/400 | 600/400 | 600/400 |
| Cycle time | s | 5.8 | 5.8 | 5.8 |
| Cap weight | g | 2.61 | 2.61 | 2.61 |

TABLE 4-continued

| Compositions | unit | Blend 1 | Blend 2 | Blend 3 |
| --- | --- | --- | --- | --- |
| Cap-ESCR 10% Igepal ® 40° C. | | | | |
| Average failure time F50 | hrs | 15.7 | 20.7 | 35.6 |
| Failure Min-Max | hrs | 13.9/18.4 | 26.1/33.3 | 29.1/42.0 |

The invention claimed is:

1. A process to produce a composition of polyethylene comprising post-consumer resin (PCR) for the production of caps and closures, the process characterized in that it comprises the steps of providing from 20 wt. % to 85 wt. % based on the total weight of the composition of a component A being one or more polyethylene post-consumer resins (PCR-PE) having a melt index (MI2) ranging from 0.8 to 3.0 g/10 min as determined according to ISO 1133-1:2011 at a temperature of 190° C. and under a load of 2.16 kg, and a density ranging from 0.940 to 0.965 g/cm³ as determined according to ISO 1183-1:2012 at 23° C.; providing a component B being a polyethylene resin having a melt index (MI2) ranging from 0.5 to 3.5 g/10 min as determined according to ISO 1133-1:2011 at a temperature of 190° C. and under a load of 2.16 kg and a density ranging from 0.940 to 0.965 g/cm³ as determined according to ISO 1183-1:2012 at 23° C.; providing one or more antioxidants; and blending the components and the one or more antioxidants to form a composition of polyethylene having a melt index (MI2) ranging from 1.0 to 3.2 g/10 min as determined according to ISO 1133-1:2011 at a temperature of 190° C. and under a load of 2.16 kg; wherein the composition of polyethylene is having a z average molecular weight (Mz) of at most 390,000 g/mol as determined by gel permeation chromatography.

2. The process according to claim 1, characterized in that the composition of polyethylene has a density ranging from 0.940 to 0.960 g/cm³ as determined according to ISO 1183-1:2012 at 23° C.; and/or a melt index (MI2) ranging from 1.3 to 2.8 g/10 min as determined according to ISO 1133-1:2011 at a temperature of 190° C. and under a load of 2.16 kg.

3. The process according to claim 1, characterized in that the content of component B in the composition is at least 15 wt. % based on the total weight of the composition of polyethylene; and/or the content of component A in the composition is ranging from 35 wt. % to 80 wt. % based on the total weight of the composition of polyethylene.

4. The process according to claim 1, characterized in that component B: is a metallocene-catalysed polyethylene resin; and/or has a molecular weight distribution $M_w/M_n$ which is ranging from 2.0 to 8.0 as determined by gel permeation chromatography, with Mw being the weight-average molecular weight and $M_n$ being the number average molecular weight and/or has a melt index (MI2) ranging from 1.0 to 3.0 g/10 min as determined according to ISO 1133-1:2011 at a temperature of 190° C. and under a load of 2.16 kg; and/or has a density ranging from 0.945 to 0.957 g/cm³ as determined according to ISO 1183-1:2012 at 23° C.

5. The process according to claim 1, characterized in that component A: is a post-consumer resin being a regrind from post-consumer sorted caps or closures; and/or has a melt index (MI2) ranging from 1.5 to 2.8 g/10 min as determined according to ISO 1133-1:2011 at a temperature of 190° C. and under a load of 2.16 kg; and/or has a density ranging from 0.945 to 0.960 g/cm³ as determined according to ISO 1183-1:2012 at 23° C.

6. The process according to claim 1, characterized in that the composition of polyethylene comprises from 100 to 5000 ppm of the one or more antioxidants based on the total weight of the composition; and/or in that the one or more antioxidants comprises at least one phenolic antioxidant and/or at least one organic phosphite or phosphonite antioxidant.

7. The process according to claim 1, characterized in that the composition: comprises at least 100 ppm of one or more antioxidants being one or more phenolic antioxidants selected from octadecyl 3-(3',5'-di-t-butyl-4-hydroxyphenyl) propionate and/or pentaerythrityl-tetrakis (3-(3',5'-di-t-butyl-4-hydroxyphenyl) propionate; and/or comprises at least 100 ppm of one or more antioxidants being at least one organic phosphite or phosphonite antioxidant selected from tris (2,4-ditert-butylphenyl) phosphite, bis (2,4-di-tert.-butyl-6-methylphenyl)-ethyl-phosphite, tris-nonylphenyl phosphite, tetrakis-(2,4-di-t-butylphenyl)-4,4'-biphenylen-di-phosphonite, 2,4,6-tri-tert-butylphenyl 2-butyl-2-ethyl-1,3-propanediol phosphite and any blend thereof.

8. The process according to claim 1, characterized in that the composition of polyethylene is having a tensile modulus of at least 900 MPa as determined according to ISO 527-1: 2012.

9. The process according to claim 1, characterized in that the composition of polyethylene: has a weight-average molecular weight (Mw) ranging from at least 50,000 g/mol to at most 150,000 g/mol as determined by gel permeation chromatography; and/or has an Mz/Mw ranging from 3.0 to 6.0 as determined by gel permeation chromatography; and/or has an Mw/Mn of at least 4.0 as determined by gel permeation chromatography.

10. The process according to claim 1, characterized in that component B is a polyethylene resin being a copolymer of ethylene and one or more C3-C20 alpha-olefin co-monomers.

11. The process according to claim 10, wherein the one or more co-monomers is 1-hexene.

12. The process according to claim 1, characterized in that component B is a polyethylene resin comprising at least two polyethylene fractions B1 and B2, wherein fraction B1: has an MI2 of at least 200 g/10 min as determined according to ISO 1133-1:2011 at a temperature of 190° C. and under a load of 2.16 kg; and/or has a density of at least 0.960 g/cm$^3$ as determined according to ISO 1183-1:2012 at 23° C.; and/or is a polyethylene homopolymer.

13. A composition of polyethylene characterized in that it is produced by the process according to claim 1.

14. A composition of polyethylene comprising from 20 wt. % to 85 wt. % of one or more post consumer resins (PCR) based on the total weight of the composition of polyethylene and one or more antioxidants; the composition being characterized in that it shows: a MI2 ranging from 1.0 to 3.2 g/10 min as determined according to ISO 1133-1:2011 at a temperature of 190° C. and under a load of 2.16 kg; a density ranging from 0.940 to 0.960 g/cm$^3$ as determined according to ISO 1183-1:2012 at 23° C.; a weight-average molecular weight Mw of at least 50,000 g/mol as determined by gel permeation chromatography; and a z average molecular weight (Mz) of at most 390,000 g/mol as determined by gel permeation chromatography.

15. A process for the production of caps or closures, said process comprising providing a composition of polyethylene according to claim 14 and injection moulding or compression moulding of the composition of polyethylene into a cap or closure.

16. A process for making a cap or closure, the process comprising obtaining a composition of polyethylene according to claim 14 and making the cap or the closure from the composition of polyethylene.

17. The process of claim 16, wherein the cap or closure is a screw cap.

18. A cap or closure characterized in that it is made of a composition of polyethylene according to claim 14.

19. The cap or closure of claim 18, wherein the cap or closure is a screw cap.

* * * * *

UNITED STATES PATENT AND TRADEMARK OFFICE
CERTIFICATE OF CORRECTION

| | | |
|---|---|---|
| PATENT NO. | : 12,129,369 B2 | Page 1 of 1 |
| APPLICATION NO. | : 18/554488 | |
| DATED | : October 29, 2024 | |
| INVENTOR(S) | : David Ribour et al. | |

It is certified that error appears in the above-identified patent and that said Letters Patent is hereby corrected as shown below:

On the Title Page

In Item (57) Abstract, delete "390.000" and insert --390,000-- therefor.

In the Claims

In Claim number 4, Column 32, Line number 50, delete "Mw" and insert --$M_w$-- therefor.

Signed and Sealed this
Tenth Day of December, 2024

Katherine Kelly Vidal
*Director of the United States Patent and Trademark Office*